US007185003B2

(12) United States Patent
Bayliss et al.

(10) Patent No.: US 7,185,003 B2
(45) Date of Patent: Feb. 27, 2007

(54) QUERY SCHEDULING IN A PARALLEL-PROCESSING DATABASE SYSTEM

(75) Inventors: David Bayliss, Delray Beach, FL (US); Richard Chapman, Boca Raton, FL (US); Jake Smith, London (GB); Ole Poulsen, Bend, OR (US); Gavin Halliday, Royston (GB); Nigel Hicks, London (GB)

(73) Assignee: Seisint, Inc., Boca Raton, FL (US)

( * ) Notice: Subject to any disclaimer, the term of this patent is extended or adjusted under 35 U.S.C. 154(b) by 774 days.

(21) Appl. No.: 10/293,489

(22) Filed: Nov. 14, 2002

(65) Prior Publication Data

US 2004/0098374 A1    May 20, 2004

(51) Int. Cl.
G06F 17/30        (2006.01)
G06F 15/16        (2006.01)
G06F 9/46         (2006.01)
(52) U.S. Cl. .......................... 707/3; 707/10; 718/102; 709/201
(58) Field of Classification Search .................... 707/3, 707/10; 718/102; 709/201–203
See application file for complete search history.

(56) References Cited

U.S. PATENT DOCUMENTS

| 4,543,630 | A | 9/1985 | Neches |
| 4,860,201 | A | 8/1989 | Stolfo et al. |
| 4,870,568 | A | 9/1989 | Kahle et al. |
| 4,925,311 | A | 5/1990 | Neches et al. |
| 5,006,978 | A | 4/1991 | Neches |
| 5,276,899 | A | 1/1994 | Neches |
| 5,303,383 | A | 4/1994 | Neches et al. |
| 5,423,037 | A | 6/1995 | Hvasshovd |
| 5,471,622 | A | 11/1995 | Eadline |
| 5,495,606 | A | 2/1996 | Borden et al. |
| 5,551,027 | A | 8/1996 | Choy et al. |
| 5,555,404 | A | 9/1996 | Torbjørnsen et al. |
| 5,655,080 | A | 8/1997 | Dias et al. |
| 5,732,400 | A | 3/1998 | Mandler et al. |

(Continued)

OTHER PUBLICATIONS

Eike Schallehn et al., "Advanced Grouping and Aggregation for Data Integration," Department of Computer Science, Paper ID: 222, pp. 1-16.

(Continued)

*Primary Examiner*—Joon Hwan Hwang
(74) *Attorney, Agent, or Firm*—Hunton & Williams LLP

(57) ABSTRACT

A system and method for scheduling database operations to one or more databases in a parallel-processing database system are described herein. After a query server generates a dynamic-link library (DLL) or other executable representative of one or more database operations to a database, the query server notifies a scheduling services module of the generation of the DLL and submits the DLL to a query agent. The query agent notifies the scheduling services module of its receipt of the DLL. Based on any of a variety of considerations, the scheduling services module schedules a time of execution for the DLL by one or more processing matrices that store the database. At the scheduled time, the scheduling services module directs the query agent to submit the DLL to the indicated processing matrices. The scheduling services module also can be adapted to monitor the execution of previously submitted DLLs by one or more processing matrices and adjust the scheduled times of execution for subsequent DLLs accordingly.

25 Claims, 21 Drawing Sheets

U.S. PATENT DOCUMENTS

| | | | |
|---|---|---|---|
| 5,745,746 | A | 4/1998 | Jhingran et al. |
| 5,857,180 | A * | 1/1999 | Hallmark et al. ............... 707/2 |
| 5,878,408 | A | 3/1999 | Van Huben et al. |
| 5,884,299 | A | 3/1999 | Ramesh et al. |
| 5,897,638 | A | 4/1999 | Lasser et al. |
| 5,983,228 | A | 11/1999 | Kobayashi et al. |
| 6,006,249 | A | 12/1999 | Leong |
| 6,026,394 | A | 2/2000 | Tsuchida et al. |
| 6,081,801 | A | 6/2000 | Cochrane et al. |
| 6,266,804 | B1 | 7/2001 | Isman |
| 6,311,169 | B2 | 10/2001 | Duhon |
| 6,427,148 | B1 | 7/2002 | Cossock |
| 6,990,503 | B1 * | 1/2006 | Luo et al. .................... 707/200 |
| 2003/0037048 | A1 * | 2/2003 | Kabra et al. .................... 707/4 |

OTHER PUBLICATIONS

Vincent Coppola, "Killer APP," Men's Journal, vol. 12, No. 3, Apr. 2003, pp. 86-90.

Eike Schallehn et al., "Extensible and Similarity-based Grouping for Data Integration," Department of Computer Science, pp. 1-17.

Rohit Ananthakrishna et al., "Eliminating Fuzzy Duplicates in Data Warehouses," 12 pages.

Peter Christen et al., "Parallel Computing Techniques for High-Performance Probabilistic Record Linkage," Data Mining Group, Australian National University, Epidemiology and Surveillance Branch, Project web page: http://datamining.anu.edu.au/linkage.html, 2002, pp. 1-11.

Peter Christen et al., "Parallel Techniques for High-Performance Record Linkage (Data Matching)," Data Mining Group, Australian National University, Epidemiology and Surveillance Branch, Project web page: http://datamining.anu.edu.au/linkage.html, 2002, pp. 1-27.

Peter Christen et al., "High-Performance Computing Techniques for Record Linkage," Data Mining Group, Australian National University, Epidemiology and Surveillance Branch, Project web page: http://datamining.anu.edu.au/linkage.html, 2002, pp. 1-14.

William E. Winkler, "Matching And Record Linkage," U.S. Bureau of the Census, pp. 1-38.

Peter Christen et al., "High-Performance Computing Techniques for Record Linkage," ANU Data Mining Group, Australian National University, Epidemiology and Surveillance Branch, Project web page: http://datamining.anu.edu.au/linkage.html, pp. 1-11.

William E. Winkler, "The State of Record Linkage and Current Research Problems," U.S. Bureau of the Census, 15 pages.

William E. Winkler, "Advanced Methods For Record Linkage," Bureau of the Census, pp. 1-21.

William E. Winkler, Frequency-Based Matching in Fellegi-Sunter Model of Record Linkage, Bureau Of The Census Statistical Research Division, Oct. 4, 2000, 14 pages.

William E. Winkler, "State of Statistical Data Editing And Current Research Problems," Bureau Of The Census Statistical Research Division, 10 pages.

The First Open ETL/EAI Software For The Real-Time Enterprise, Sunopsis, A New Generation ETL Tool, "Sunopsis™ v3 expedites integration between heterogeneous systems for Data WAREHOUSE, Data Mining, Business Intelligence, and OLAP projects," <www.suopsis.com>, 6 pages.

Alan Dumas, "The ETL Market and Sunopsis™ v3 Business Intelligence, Data Warehouse & Datamart Projects," 2002, Sunopsis, pp. 1-7.

Teradata Warehouse Solutions, "Teradata Database Technical Overview," 2002, pp. 1-7.

WhiteCross White Paper, May 25, 2000, "wx/des-Technical Information," pp. 1-36.

Teradata Alliance Solutions, "Teradata and Ab Initio," pp. 1-2.

Peter Christen et al., The Australian National University, "Febrl—Freely extensible biomedical record linkage," Oct. 2002, pp. 1-67.

William E. Winkler, "Using the EM Algorithim for Weight Computation in the Fellegi-Sunter Model of Record Linkage," Bureau Of The Census Statistical Research Division, Oct. 4, 2000, 12 pages.

William E. Winkler et al., "An Application Of The Fellegi-Sunter Model Of Record Linkage To The 1990 U.S. Decennial Census," U.S. Bureau of the Census, pp. 1-22.

William E. Winkler, "Improved Decision Rules In The Fellegi-Sunter Model Of Record Linkage," Bureau of the Census, pp. 1-13.

Fritz Scheuren et al., "Recursive Merging and Analysis of Administrative Lists and Data," U.S. Bureau of the Census, 9 pages.

William E. Winkler, "Record Linkage Software and Methods for Merging Administrative Lists," U.S. Bureau of the Census, Jul. 7, 2001, 11 pages.

Enterprises, Publishing and Broadcasting Limited, Acxiom-Abilitec, pp. 44-45.

TransUnion, Credit Reporting System, Oct. 9, 2002, 4 pages, <http://www.transunion.com/content/page.jsp?id=/transunion/general/data/business/BusCre...>.

TransUnion, ID Verification & Fraud Detection, Account Acquisition, Account Management, Collection & Location Services, Employment Screening, Risk Management, Automotive, Banking-Savings & Loan, Credit Card Providers, Credit Unions, Energy & Utilities, Healthcare, Insurance, Investment, Real Estate, Telecommunications, Oct. 9, 2002, 46 pages, <http://www.transunion.com>.

White Paper An Introduction to OLAP Multidimensional Terminology and Technology, 20 pages.

* cited by examiner

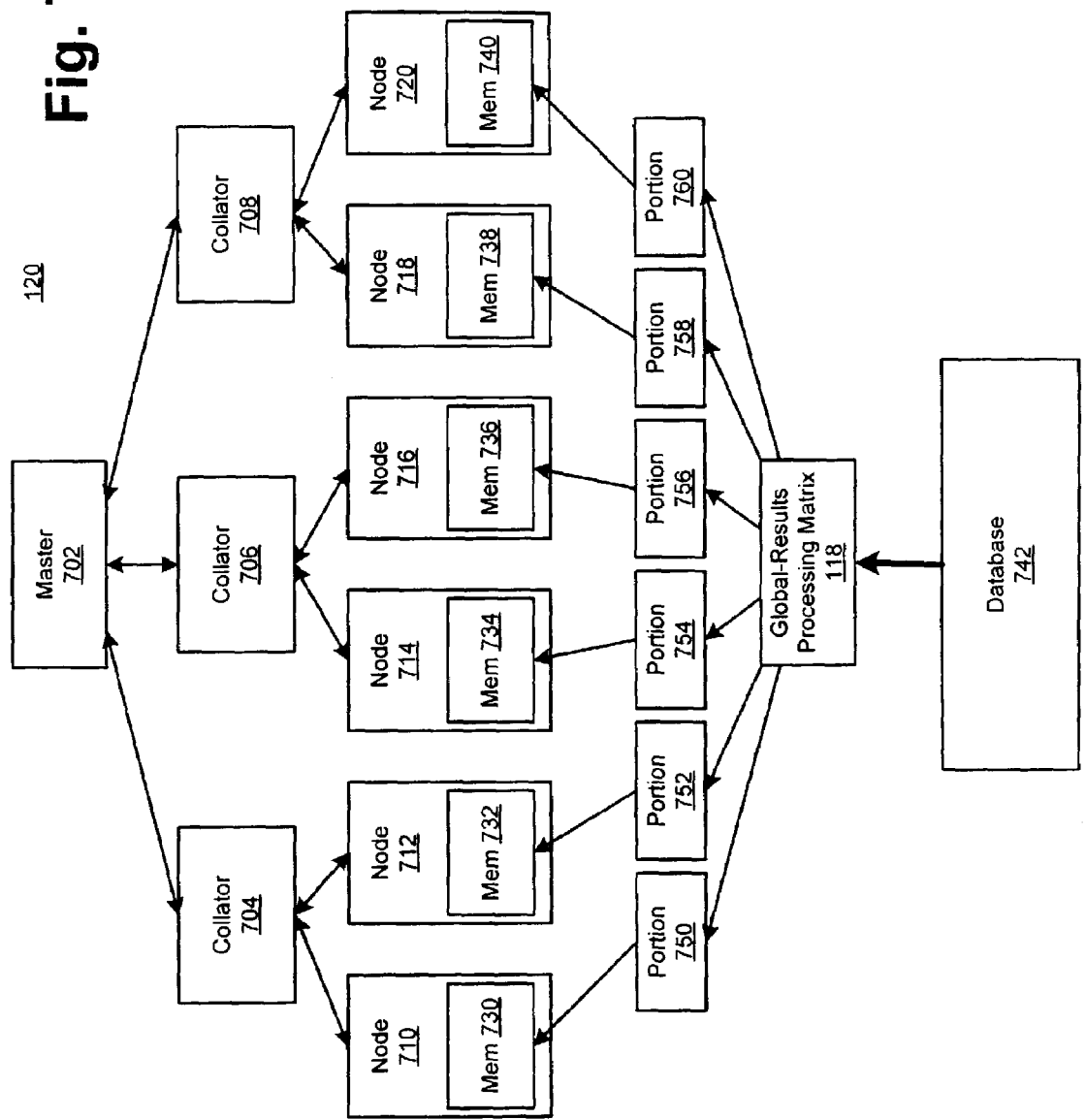

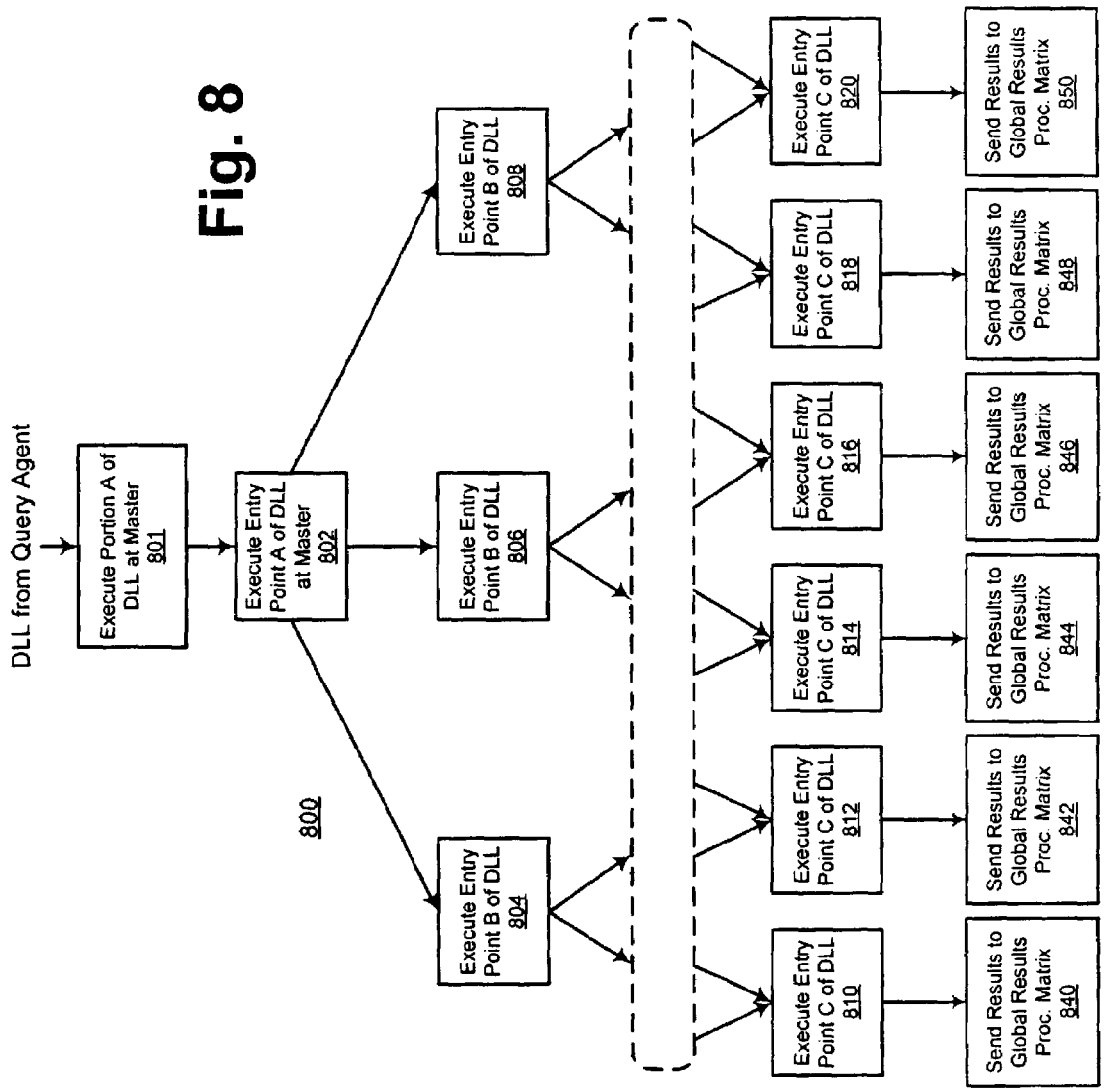

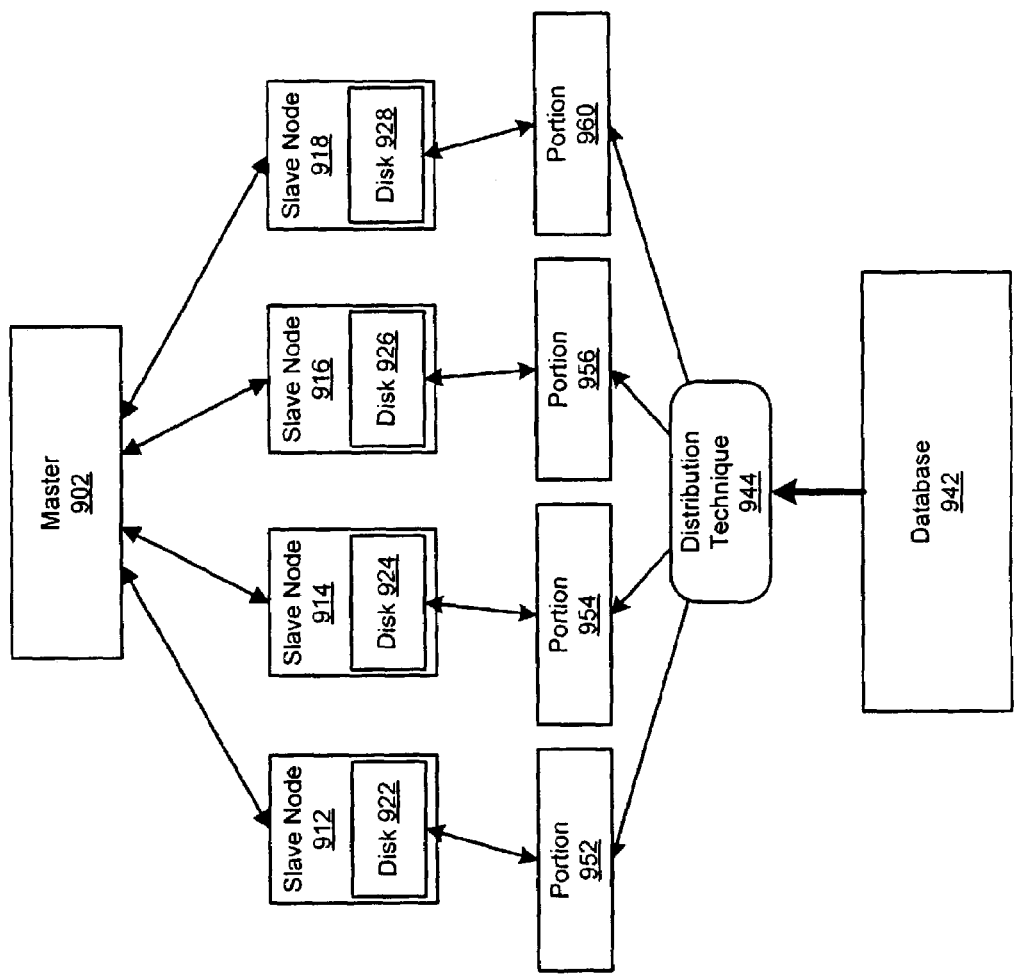

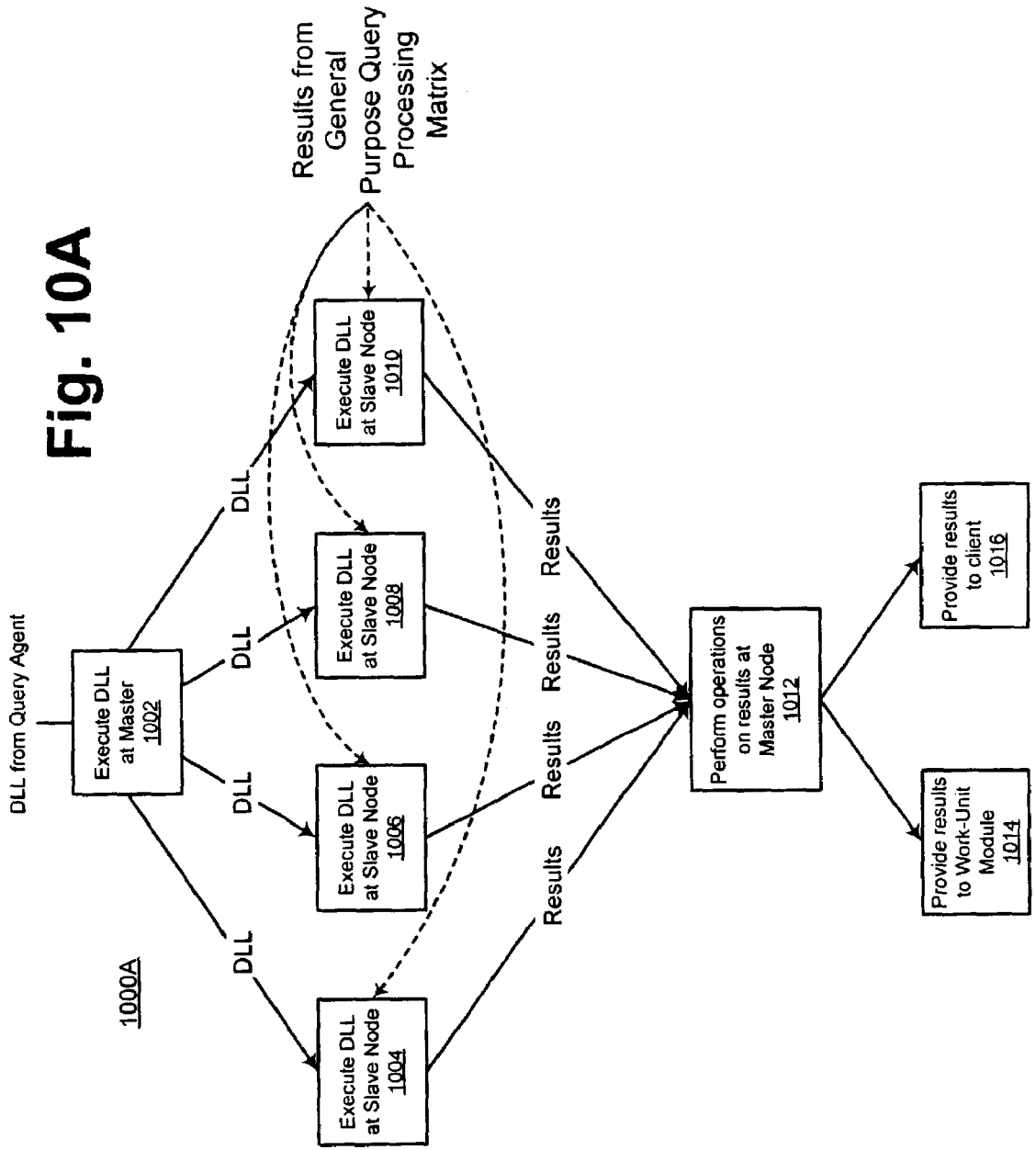

1100A

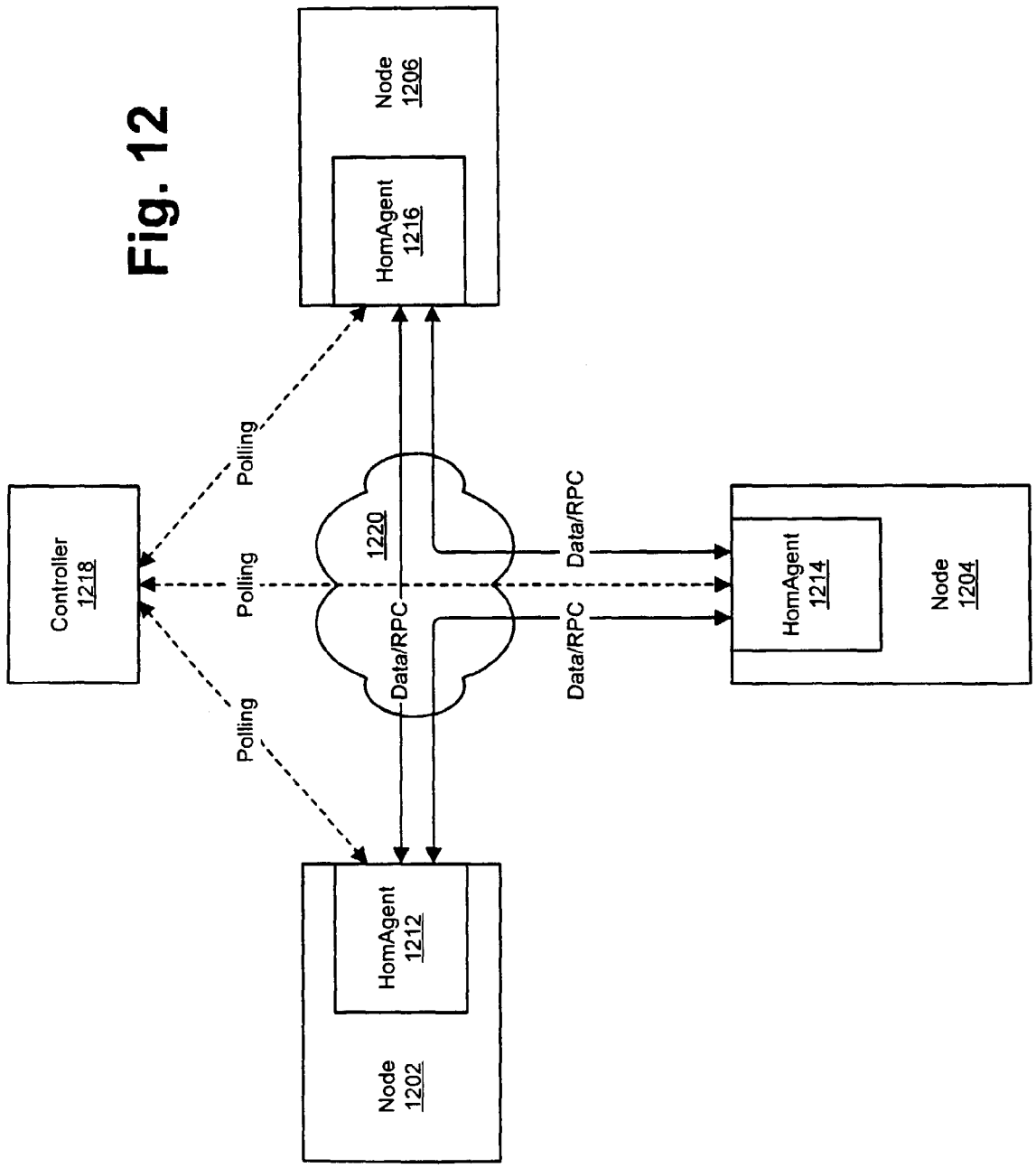

Production Phase

QUERY SCHEDULING IN A PARALLEL-PROCESSING DATABASE SYSTEM

FIELD OF THE INVENTION

The present invention relates generally to database management and more particularly to parallel processing of database queries in a parallel processing system.

BACKGROUND OF THE INVENTION

The rapid increase in the amount of data generated by companies, agencies, and other organizations has taxed the capabilities of current relational database management systems (RDMSs). To illustrate, some organizations have access to databases having hundreds of millions, and even billions, of records available through a RDMS. In such RDMSs, certain database operations (e.g., database joins, complex searches, extract-transform-load (ETL) operations, etc.) can take minutes, hours, and even days to process using current techniques. This processing lag often prevents access to the data in a timely manner, thereby inhibiting the client in its use of the requested information.

In response to the increasing lag time resulting from increased database sizes, software manufacturers and data mining/storage companies have strived to create more efficient RDMSs and data query techniques. In particular, a number of database management systems have been developed to implement parallel processing for performing database management and database operations.

A typical parallel-processing RDMS implementation includes using a symmetric multiprocessing (SMP) system for database operations. In general, SMP systems incorporate a number of processors sharing one or more system resources, such as memory or disk storage. The data representing the database(s) is stored in the memory and/or disk storage shared by the processors. Each processor is provided a copy of the database operation to be performed and executes the database operation on the data in parallel with the other processors.

While SMP systems have the potential to improve the efficiency of database operations on large databases by removing the processor as the bottleneck, current implementations have a number of limitations. For one, the shared memory/disk storage often becomes the limiting factor as a number of processors attempt to access the shared memory/disk storage at the same time. Simultaneous memory/disk storage accesses in such systems typically result in the placement of one or more of the processors in a wait state until the memory/disk storage is available. This delay often reduces or eliminates the benefit achieved through the parallelization of the database operation. Further, the shared memory/disk storage can limit the scalability of the SMP system, where many such systems are limited to eight processors or less.

Another limitation common to SMP database systems is the cost of implementation. SMP systems, as a result the underlying architecture needed to connect multiple processors to shared resources, are difficult to develop and manufacture, and are, therefore, often prohibitively expensive. In many cases, the SMP database systems implement a proprietary SMP design, requiring the client of the SMP database system to contract with an expensive specialist to repair and maintain the system. The development of operating system software and other software for use in the SMP database system is also often complex and expensive to develop.

The performance of parallel processing database systems, SMP or otherwise, is often limited by the underlying software process used to perform the database operation. In general, current parallel-processing database systems implement one or more interpreted database-enabled programming languages, such as Simple Query Language (SQL), Perl, Python and the like. In these systems, the database operation is constructed as one or more instructions in the interpreted programming language and the set of instructions are submitted to the SMP system. The SMP system, in turn, typically provides one or more of the instructions to each of the processors. Each processor implements an interpreter to interpret each instruction and generate the corresponding machine-level code. Instruction sets constructed using an interpreted language typically are transformed into a parse tree. The interpreter (executed by the processor) then "walks-down" the parse tree and, at each node, instructs the processor to execute a predefined library code segment associated with the syntax at the node.

It will be appreciated by those skilled in the art that the use of an interpreted language is inherently inefficient from a processing standpoint. For one, the step of interpreting and then executing a predefined library code segment at run-time often requires considerable processing effort and, therefore, reduces overall efficiency. Secondly, interpreters often use a predetermined machine-level code sequence for each instruction, thereby limiting the ability to optimize the code on an instruction-by-instruction basis. Thirdly, because interpreters consider only one node (and its related child nodes) at a time, interpreters typically are unable to globally optimize the database operation by evaluating the instructions of the database operation as a whole.

Current techniques for data storage in conventional parallel-processing database systems also exhibit a number of limitations. As noted above, current parallel-processing database systems often implement shared storage resources, such as memory or disk storage, which result in bottlenecks when processors attempt to access the shared storage resources simultaneously. To limit the effects of shared storage, some current parallel-processing systems distribute the data of the database to multiple storage devices, which then may be associated with one or more processing nodes of the database system. These implementations, however, often have an inefficient or ineffective mechanism for failure protection when one or more of the storage devices fail. When a failure occurs, the storage device would have to be reinitialized and then repopulated with data, delaying the completion of the database operation. Additionally, the data may be inefficiently distributed among the storage devices, resulting in data spillover or a lack of proper load-balancing among the processing nodes.

Accordingly, improved systems and techniques for database management and access would be advantageous.

SUMMARY OF THE INVENTION

The present invention mitigates or solves the above-identified limitations in known solutions, as well as other unspecified deficiencies in known solutions. A number of advantages associated with the present invention are readily evident to those skilled in the art, including economy of design and resources, transparent operation, cost savings, etc.

The present invention provides a number of systems and methods for efficiently processing database operations on a relatively large database. In at least one embodiment, a database management system including one or more query servers, one or more query agents, and a computing matrix are used to process one or more queries submitted by a client. The computing matrix may comprise one or more of a global-results processing matrix, a general-purpose query processing matrix, and an index-based query processing matrix. Each processing matrix may comprise a plurality of interconnected processing nodes, at least a portion of which are adapted to process in parallel. In at least one embodiment, each of the processing nodes is a "shared nothing" processing node having a separate processor, memory, disc storage(s), and network interface. Further, in one embodiment, the hardware for each processing node includes widely-available general-purpose, single-user microcomputer components, such as a personal computer (PC) motherboard, processor, random access memory (RAM), hard drive, network interface card (NIC), and the like.

The client preferably provides a set of query-based programming instructions representative of the desired query. The query server then may be adapted to convert the query-based programming instructions to source code in a high-level programming language (e.g., C++), which the query server may then optimize for more efficient execution. The query server then compiles the source code to generate one or more executables in machine-level code, such as a dynamic link library (DLL) or a fully-linked "program."

After generating the executable, the query server can provide the executable(s) to the query agent. In the event that the database operation(s) represented by the executable are not relatively processor-intensive, the query agent can be adapted to execute the executable(s) itself. Alternatively, or in addition, the query agent can provide the executable to one or more of the processing matrices of the computing matrix for processing. Upon receipt of the executable at a processing matrix, a subset of the processing nodes of the processing matrix execute one or more portions of the executable in parallel on the portion of the database at each processing node. The results of the execution may then be returned to the client, stored, or provided to another processing matrix for additional processing.

Also described herein are a system and method for scheduling database operations to one or more databases in a parallel-processing database system in accordance with at least one embodiment of the present invention. After a query server generates a dynamic-link library (DLL) or other executable representative of one or more database operations to a database, the query server notifies a scheduling services module of the generation of the DLL and submits the DLL to a query agent. The query agent notifies the scheduling services module of its receipt of the DLL. Based on any of a variety of considerations, the scheduling services module schedules a time of execution for the DLL by one or more processing matrices that store the database. At the scheduled time, the scheduling services module directs the query agent to submit the DLL to the indicated processing matrices. The scheduling services module also can be adapted to monitor the execution of previously submitted DLLs by one or more processing matrices and adjust the scheduled times of execution for subsequent DLLs accordingly.

In accordance with one embodiment of the present invention, a system for scheduling database operations on at least one database is provided. The system comprises a first global-results processing matrix having a plurality of interconnected processing nodes operating in parallel and being adapted to execute an executable on the at least one database, the executable being representative of a query having at least one database operation and a first query agent operably connected to the first global-results processing matrix and being adapted to manage the execution of the executable by the first global-results processing matrix. The system further comprises a scheduling services module operably connected to the query agent and the first global-results processing matrix and being adapted to schedule a time for execution of the executable by the first global-results processing matrix and direct the first query agent to submit the executable to the first global-results processing matrix for execution at the scheduled time of execution.

In a parallel processing based database management system, a method is provided for scheduling execution of compiled executables representing queries having at least one database operation in accordance with at least one embodiment of the present invention. The method comprises the steps of scheduling a time for execution of an executable by a first global-results processing matrix and submitting, at the scheduled time, the executable to the first global-results processing matrix for execution.

BRIEF DESCRIPTION OF THE DRAWINGS

The purpose and advantages of the present invention will be apparent to those of ordinary skill in the art from the following detailed description in conjunction with the appended drawings in which like reference characters are used to indicate like elements, and in which:

FIGS. 7A and 7B are schematic diagrams illustrating an exemplary general-purpose query processing matrix of the system of FIG. 1 in accordance with at least one embodiment of the present invention.

FIG. 8 is a flow diagram illustrating an exemplary operation of the general-purpose query processing matrix of FIGS. 7A and 7B in accordance with at least one embodiment of the present invention.

FIGS. 9A and 9B are schematic diagrams illustrating an exemplary global-results processing matrix of the system of FIG. 1 in accordance with at least one embodiment of the present invention.

FIGS. 10A and 10B are flow diagram illustrating exemplary operations of the global-results processing matrix of the system of FIG. 9 in accordance with at least one embodiment of the present invention.

FIG. 12 is a schematic diagram illustrating an exemplary implementation of a homogeneous agent at each node of a processing matrix for executing at least part of an executable.

DETAILED DESCRIPTION OF THE INVENTION

The following description is intended to convey a thorough understanding of the present invention by providing a number of specific embodiments and details involving parallel processing of database queries. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

A processor is generally understood in the art to include any of a variety of digital circuit devices adapted to manipulate data or other information by performing one or more tasks embodied as one or more sets of instructions executable by the digital circuit device. Processors typically include some form of an arithmetic logical unit (ALU) adapted to perform arithmetic and/or logical functions, internal memory resources such as registers, cache, on-chip random access memory (RAM) or read only memory (ROM), and the like, and a control unit adapted to load instructions and/or data from external memory and/or the internal memory resources and execute the instructions using the ALU and other processor resources as appropriate. Processors can be adapted for general processing, such as a central processing unit (CPU) of a personal computer, or processors can be adapted to perform more specific functions, such as a digital signal processor (DSP) used in, for example, cellular phones. Examples of processors include microprocessors (also known as central processing units or CPUs), microcontrollers, and the like. An exemplary general-purpose processor suitable for use in at least one embodiment of the present invention includes the Pentium® III processor operating at, for example, 1.26 gigahertz (GHz) available from Intel Corporation of Santa Clara, Calif.

A database generally is understood in the art to include one or more data sets arranged in any of a variety of ways known to those skilled in the art, such as one or more tables having one more records. A database operation generally includes any primitive transform supported at the database layer, such as a sort operation, a join operation, a select operation, and the like. A database operation may be viewed as analogous to a single instruction in SQL. For example, the "SELECT" instruction in SQL represents a database operation whereby data in the target database meeting the criteria specified in the "SELECT" SQL command is located and output to the client in the specified format. In this case, the "SELECT" command represents a database operation. By extension, a query typically includes a sequence of one or more database operations intended to provide a desired result using the data of the a data dictionary and/or one or more databases.

Figure 1:
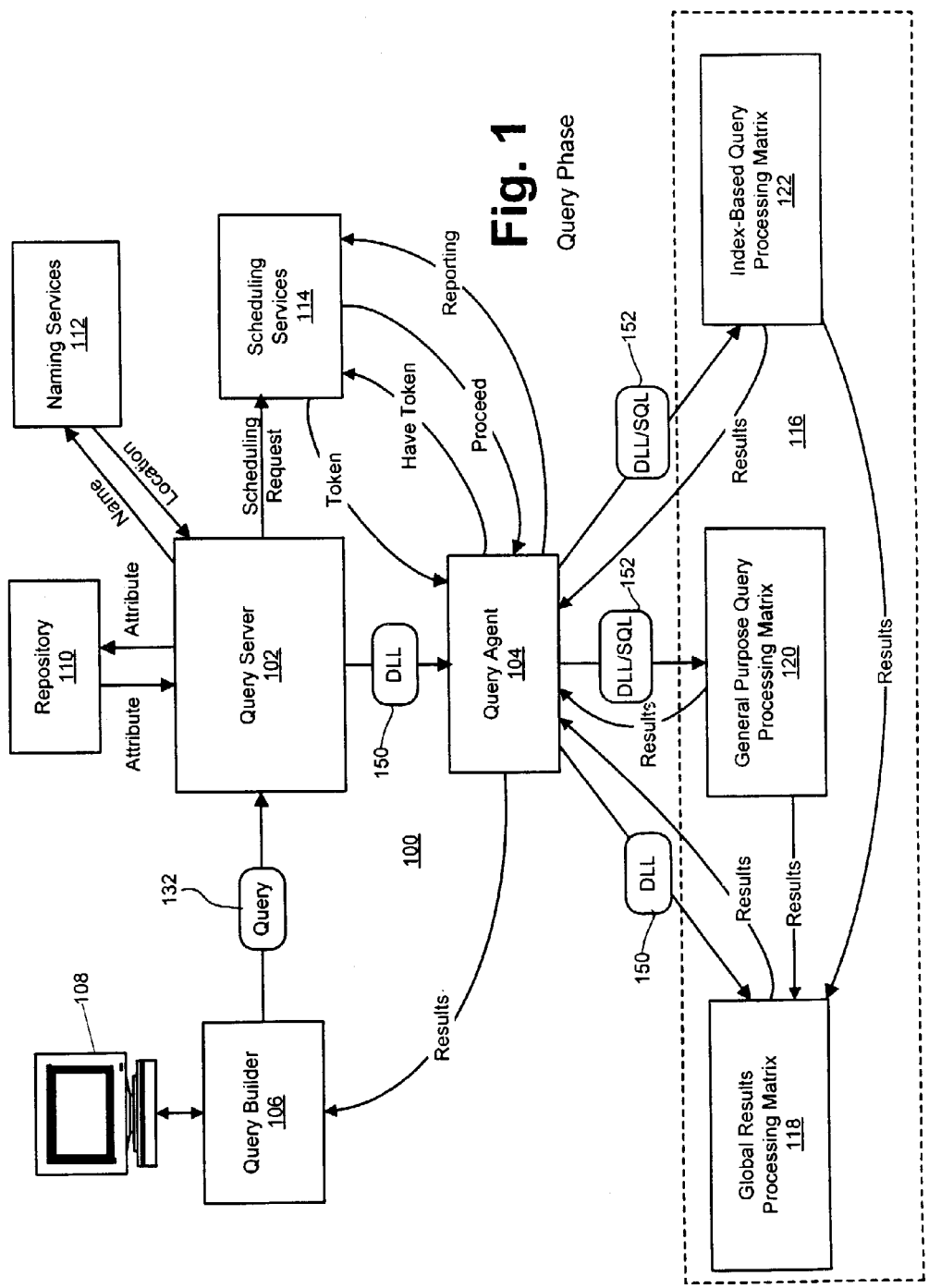
FIG. 1 is a schematic diagram illustrating an exemplary parallel-processing database management system in accordance with at least one embodiment of the present invention.

Referring now to FIG. 1, an exemplary database management system 100 for processing queries to one or more databases is illustrated in accordance with at least one embodiment of the present invention. In the illustrated example, the system 100 includes a query server 102, a query agent 104, a query builder module 106, a repository 110, a naming services module 112, a scheduling services module 114, and a computing matrix 116. The computing matrix 116 can comprise one or more parallel-processing matrices, such as a global-results processing matrix 118, a general-purpose query processing matrix 120, an index-based query processing matrix 122, and the like. Although the illustrated exemplary embodiment includes one of each type of processing matrices 118–122, any number and/or combination of processing matrices may be implemented in accordance with at least one embodiment of the present invention.

In at least one embodiment, the system 100 is adapted to receive and process one or more queries received from one or more clients. Queries submitted by clients can include, for example, linking, matching, filtering, scoring, simple searching, neural net scoring, data sorting, merge operations, purge operations, heuristic propensity scoring, data formatting, extract-transform-load (ETL) operations, and the like. Queries submitted by a client to the query server 102 preferably are formatted using a query programming language having specified syntax and structure, similar to high-level programming languages such as C++. This programming language, referred to herein as Enterprise Control Language (ECL), can include actions (also referred to as "functions"), constants, variables, expressions and operations, keywords, workflow services, and the like. To illustrate, to generate a list of people sorted by age, the simple query formatted in ECL as "T:=SORT(Person, Person.age)" could be generated, where the attribute "T" represents the resulting record set of people sorted by age, "SORT" represents the sorting function, "Person" represents the record set of people, and "Person.age" represents the attribute defining the age field of each "Person" entry of the record set "Person". In other embodiments, the query can be described using any of a variety of techniques and/or programming languages as appropriate. For example, rather than using the ECL language, a client could generate a query using SQL or Perl and submit the SQL/Perl query to the query server 102 for processing.

In at least one embodiment, the query builder module 106 is adapted to facilitate the client in generating queries. The query builder module 106 can include software executed on, for example, client computer 108 and can implement a graphical client interface (GUI) to receive client input. To illustrate, the query builder module 106 could include software adapted to receive command-line input in the format of the ECL language or other appropriate programming language. Alternatively, the query builder module 106 could include a GUI used by the client to enter one or multiple lines of ECL language or other query-based language representing one or more queries. In another embodiment, the query builder module includes an XML template generated by the query server 102 and displayed on, for example, a web browser at the client computer 108. Using this displayed template, a client may input one or more queries in the input fields provided.

Regardless of the technique used to input a desired query to the query builder module 106, the query builder module 106 is adapted to generate a representation of the query (query representation 132) and provide the representation to the query server 102. The query representation 132 can take any of a variety of forms. As noted above, in one embodiment the query builder module 106 is implemented as an XML web page, whereby the client can submit queries to the query server 102 via a network, such as the Internet. In this case, the query builder module 106 could receive the query input from the client, generate a hypertext markup language (HTML) or extensible markup language (XML) document representing the query input, and transmit the document to the query server 102 for processing using, for example, the Simple Object Access Protocol (SOAP). Alternatively, the query builder module 106 could include a stand-alone software program or integrated utility executed by the client computer 108, whereby the query provided from a client is transmitted to the query server 102. For example, the query may be transmitted as a text file having the set of high-level programming language instructions representative of the query (one embodiment of the query representation 132). Various implementations of the query builder module 106 are discussed below with reference to FIG. 6.

Upon receipt of the query representation 132 from the query builder 106, the query server 102, in one embodiment, is adapted to convert the query representation 132 into intermediary source code, such as source code segment structured in C, C++, Fortran, Pascal, and the like. The query server 102 then compiles the intermediary source code to generate one or more executables (i.e., the executable machine code representation of the source code). The executable(s) preferably include dynamically-linked executables, such as dynamic link libraries (DLLs), parts or all of which can be executed dynamically by another executable (such as a homogenous agent, discussed below). Alternatively, the executable(s) could include a fully linked executable or a shared library. For purposes of explanation, a particular implementation of the executable as a DLL is described herein. The generation of one or more executables for execution by the computing matrix 116 is discussed in greater detail below with reference to FIGS. 3–5. For explanatory purposes, an exemplary implementation wherein a single DLL representing an entire query is generated and processed by the system 100 is illustrated herein. Using the guidelines provided herein, those skilled in the art can adapt the system 100 for generation and processing of multiple DLLs or other types of executables for a single submitted query.

In the course of generating a DLL, the query server 102 may utilize one or both of the repository 110 and the naming services module 112. As discussed in greater detail herein, an ECL-based query submitted by the query builder 106 may include one or more attributes, where attributes can include client- or system-defined values, actions, expressions, and the like. Attributes also may be nested. To illustrate, consider the following ECL coding sequence for determining those people represented in a financial record set that have more than five credit accounts:

CountTrades:=COUNT(Trades);

IsBigSpender:=CountTrades>5;

OUTPUT(Person(IsBigSpender), {person.lastname});
. . .

In the first line, the attribute "CountTrades" implements the action "COUNT" and is defined as a total number of credit accounts (i.e., "Trades") associated with a record entry. In the second line, the attribute "IsBigSpender" implements a boolean expression and the "CountTrades" attribute and is defined as all entries of a record set having more than five credit accounts. In the third line, the "OUTPUT" action is used to output the last names of those entries of the record set "Person" having more than five credit accounts.

In the course of creating the ECL-based, attributes defined in the submitted query can be added to the repository 110. During the compilation of an ECL-based query into a DLL, the query server 102 can access the definitions of those attributes included in the ECL-based query from the repository 110. The repository 110 therefore can be viewed as a database or library of attributes used by clients to generate ECL queries and by the query server 102 in the generation of the corresponding DLL.

The repository 110 can be implemented in any of a variety of ways. The repository 110 could include a file server for a plurality of files, each file having the definition of one or more attributes. Preferably, however, the repository 110 is implemented as a structured query language (SQL) or an XML query language (XQL) database server, such as the Adaptive Server Enterprise available from Sybase, Inc. of Dublin, Calif.

Domain Name Service (DNS) often is used to translate domain names into Internet Protocol addresses for the corresponding network devices. In a similar manner, the naming services module 112 is adapted to translate the names of various data sets or databases referenced in a query into the actual location of the referenced name. To illustrate using the previous exemplary ECL code sequence, the query server 102 could submit the name "Persons" representative of the "persons" data set to the naming services module 112. The naming services module 112 could search its database for the physical location of the data set (e.g., a file located at "\datasets\persons.sq1") corresponding to the name "Persons" and return this file location to the query server 102. The query server 102 then can incorporate the location into the DLL compiled from the submitted query. Alternatively, as discussed in greater detail below, the compiled DLL can include a generic reference that the naming services module 112 resolves at runtime when the DLL is executed by one or more of the processing matrices 118–122. As with the repository 110, the naming services module 112 can be implemented in any of a variety of ways, preferably as a SQL or XQL database server.

In at least one embodiment, the system 100 includes a plurality of query servers 102 and/or a plurality of query agents 104 to process multiple queries. The scheduling services module 114, in one embodiment, is adapted to prevent one or more queries (represented by DLLs) from being submitted to one or more components of the computing matrix 116 while those components are occupied processing another database operation. Accordingly, the query server 102 can be adapted to submit a scheduling request to the scheduling services module 114 after generating a DLL representing a submitted query. The scheduling request can include an estimated execution time of the DLL in whole or in part, a priority indicator, an indicator of the number and/or type(s) of processing matrices needed to process the DLL, and the like. After submitting the scheduling request, the query server 102 may then submit the DLL (DLL 150) to the query agent 104 for processing.

Using the submission request information, the scheduling services module 114 determines the next available time that the query can be processed and generates a token associated with the scheduling request. The token is provided to the query agent 104 having the corresponding DLL 150, either directly or via the query server 102. The query agent 104 then informs the scheduling services module 114 that it has received the token and requests that the scheduling services module 114 notify the query agent 104 when it has permission to proceed. At the designated time, the scheduling services module 114 notifies the query agent 104 to proceed with the submission of the DLL 150 to the computing matrix 116. In the event that the processing of a previously submitted DLL is running ahead of or behind schedule, the scheduling services module 114 can adjust the submission time of the next DLL accordingly.

In at least one embodiment, the computing matrix 116 includes one or more types of parallel-processing processing matrices adapted to perform various database operations. In the illustrated embodiment, the computing matrix 116 is shown having three processing matrices (or sub-matrices): a general-purpose query processing matrix 120 adapted to perform database operations on preferably hierarchical data, an index-based query processing matrix 122 customized for index-based queries, and a global-results processing matrix 118 adapted to perform various operations on a large amount of data, such as sorting, collating, counting, duplicate record resolution (i.e., "deduping"), joining, appending, merging, purging, non-hierarchical linking, formatting, and the like. The processing matrices 118–122 are discussed in greater detail with reference to FIGS. 7–17. Although a particular configuration of processing matrices is illustrated, the computing matrix 116 can include any number and combination of processing matrices 118–122 as appropriate without departing from the spirit or the scope of the present invention.

Depending on the particular query, the query agent 104 can provide the DLL 150 to a specific type of processing matrix or the query agent 104 can use multiple processing matrix types in sequence or in parallel to process the query represented by the DLL 150. To illustrate, consider a query to a state's motor vehicle registration database resulting in a list of all registered drivers who own a black automobile, sorted by last name. This query requires at least two operations: identifying the registered drivers who own a black car in the database and sorting the identified registered drivers by last name. Since the general-purpose query processing matrix 120, in one embodiment, is particularly well suited for identification analysis, the query agent 104 can direct the general-purpose query processing matrix 120 to perform the identification operation of the DLL 150 and to provide the results to the global-results processing matrix 118. The query agent 104 then can direct the global-results processing matrix 118 to perform the sorting operation of the DLL 150 on the results generated by the general-purpose query processing matrix 120. Alternatively, two DLLs could be generated, one representing the identification operation and one representing the sorting operation, the former assigned to the general-purpose query processing matrix 120 and the latter assigned to the global-results processing matrix 118. The results (i.e., the sorted list) from the global-results processing matrix 118 then can be provided back to the query agent 104 for storage and/or delivery to the client via, for example, the query builder module 106. In a similar manner, the results from an operation performed by the index-based processing matrix 122 can be provided to the global-results processing matrix 118 for additional processing.

In some instances, the query agent 104 can be adapted to process the DLL 150 in whole or in part prior to or after receiving permission from the scheduling services module 114. The processing performed by the query agent 104 using the DLL 150, in at least one embodiment, is dependent on the type of query represented by the DLL. For relatively simple queries involving a few database operations on a relatively small data set, the query agent 104 can be adapted execute the DLL 150 itself. For more complex queries, the query agent 104 is adapted to submit the DLL 150 or some derivative of the DLL 150 to one or more of the processing matrices 118–122 of the computing matrix 116 for processing. The query agent 104 also can be adapted to report various events to the scheduling services module 114, such as time of submission of the DLL 150, status of the processing of the DLL 150, time of completion, errors, and the like.

The query agent 104 can submit the DLL 150 to the processing matrices 118–122 of the computing matrix 116 in a variety of ways. For queries involving the global-results processing matrix 118, the query agent 104 can provide the DLL 150 directly to the processing matrix 118. In at least one embodiment, however, the general-purpose query processing matrix 120 and the index-based query processing matrix 122, are adapted simulate the operation of, for example, a SQL server wherein the query agent 104 submits an SQL or XQL query to one or both of the processing matrices 120, 122 for execution. The SQL/XQL query can be embedded in the DLL 150 by the query server 102, extracted by the query agent 104, and then provided to the processing matrix 120/processing matrix 122. Upon receipt of the SQL/XQL query, the master node of the processing matrix 120/122 is adapted to generate another executable (e.g., another DLL) from the embedded SQL/XQL instructions. The master node then provides the newly generated DLL to a subset of the processing nodes of the processing matrix 12/122 for execution. Alternatively, the query agent 104 can be adapted to extract the embedded SQL/XQL instructions from the DLL 150 and compile a new DLL 152 from the extracted SQL/XQL instructions. The DLL 152 then may be submitted to the processing matrix 120/processing matrix 122 for execution.

The results of a database operation by the computing matrix 116 can be managed in a variety of ways. Depending on the query, the results can remain in data storage or memory of the processing matrices, especially when the results are known or expected to be used in subsequent database operations. The results can be forwarded to the query agent 104 for further processing and/or the results can be stored in a common work-unit storage module (as discussed in greater detail with reference to FIG. 2). The results also could be transmitted back to the client by the query agent 104 via, for example, as a file transferred over a network.

Once the execution of a submitted query has been completed, the query agent 104 can be adapted to report to the scheduling services module 114. The scheduling services module 114 can adjust the scheduling of subsequent queries, if necessary, and then notify the next scheduled query server that its DLL can now be submitted to the computing matrix 116 for processing. Part of the scheduling process may include determining which processing matrices of the computing matrix 116 should be used for the optimum utilization of the system. To illustrate, the computing matrix 116 may implement two global-results processing matrices 118, each having five nodes, a global-results processing matrix 118 having 20 nodes, and a global-results processing matrix 118 having one hundred nodes. It will be appreciated that the use of the hundred node processing matrix 118 to perform a database operation suitable for a five node processing matrix 118 is relatively inefficient or at least consumes system resources that could be used to satisfy another query. Accordingly, the scheduling services module 114 can be adapted to analyze the processing demands of all submitted requests to determine the most appropriate allocation of the database operations among the processing matrices as well as the timing of their submission.

Figure 2:
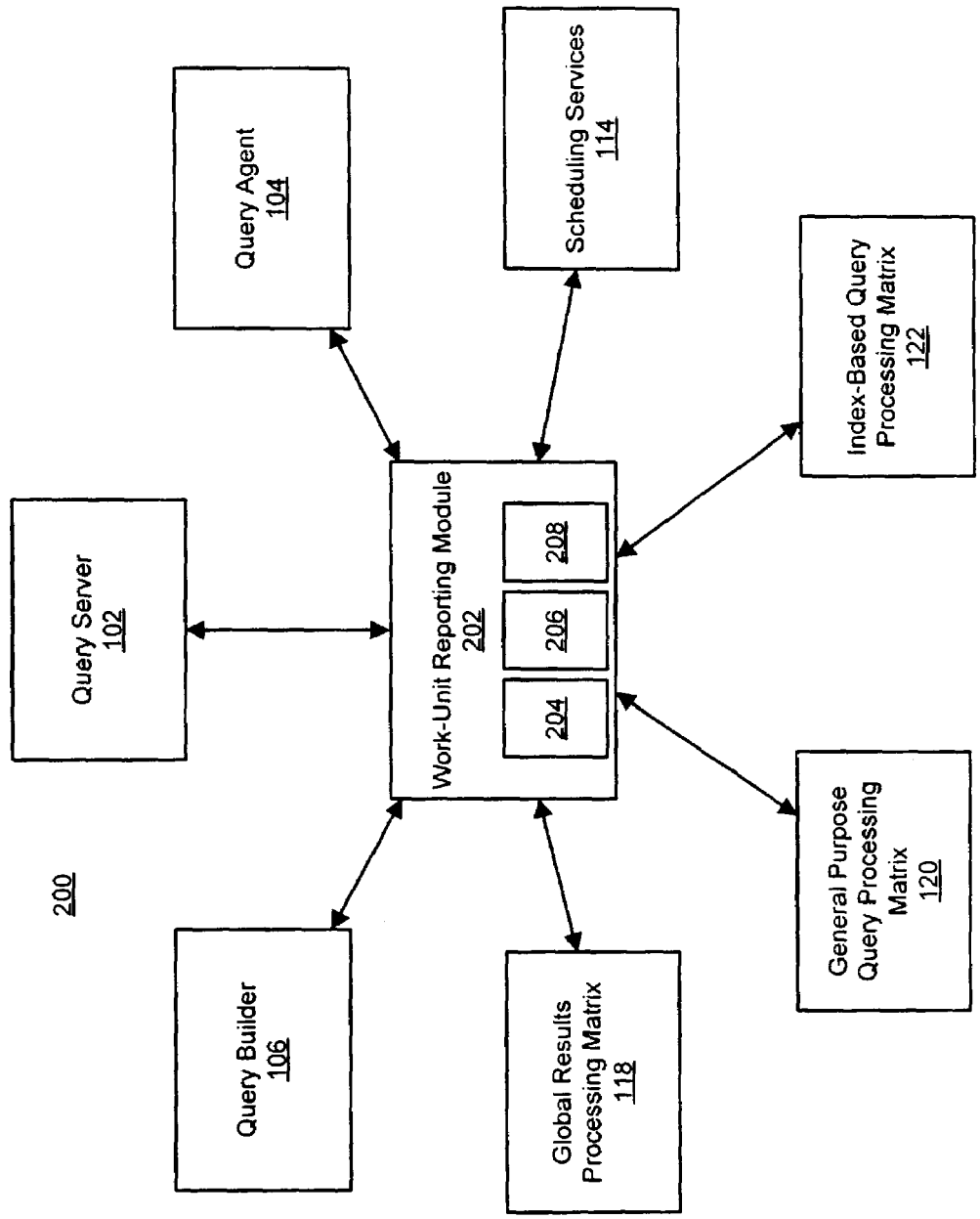
FIG. 2 is a schematic diagram illustrating an exemplary system for monitoring a work state of the system of FIG. 1 in accordance with at least one embodiment of the present invention.

Referring now to FIG. 2, an exemplary system 200 for recording the state of the system 100 is illustrated in accordance with at least one embodiment of the present invention. The system 200 includes a work-unit reporting module 202 preferably connected to one or more of the query server 102, the query agent 104, the query builder module 106, the scheduling services module 114, the index-based query processing matrix 122, the general-purpose query processing matrix 120, and the global-results processing matrix 118, as well as other components of the system 100 as appropriate. The work-unit reporting module 202 preferably includes a read-write data store, such as a transactional-hierarchical database server implemented on one of the nodes of the system 100. In at least one embodiment, the work-unit reporting module 202 is adapted to maintain a work-unit (e.g., work-units 204–208) for each query submitted to the system 100 for processing. The work-unit for a query can include a log of the various events in the system 100 while processing the query, messages between components, and if the results of the query are of an acceptable size, the work-unit can include the results of the query. Alternatively, the query results may be stored elsewhere, such as in a data store (not shown), on nodes of one or more of the processing matrices 118–122, and the like. In this case, the related work-unit can store references to the storage locations of the query results. For example, if the query results are stored as a file on a networked device, the file reference could include the network address of the networked device and the filename of the file storing the query results.

When a client submits a query (e.g., through query builder module 106), the work-unit reporting module 202, in one embodiment, creates a new work-unit associated with the submitted query. The query can be included with the work-unit. As the query server 102 processes the query to generate a DLL, the query server 102 can submit various events to the work-unit reporting module 202 for inclusion with the stored work-unit. For example, the query server 102 can be adapted to perform a syntax check on the query and report the result of the syntax check to the work-unit reporting module. Likewise, the query server 102 can report to the work-unit reporting module 202 when the DLL is generated and when the DLL is submitted to the computing matrix 116 (FIG. 1) for processing. The query server 102 also can submit an estimate of the processing time required for the query at each processing matrix of the computing matrix 116 expected to be used in processing the DLL.

Errors or events during the processing of the DLL by the query agent 104 and/or the computing matrix 116 can be reported to the work-unit reporting module 202 for inclusion in the associated work-unit. Such events and errors can include, but are not limited to, a failure of a node of a processing matrix, the transfer of results between processing matrices 118–122, data integrity errors, the time of completion of the query, and the like. Further, the results of the query can be stored with the corresponding work-unit if the data is of an acceptable size, as well as a description of the results, such as the number of records returned, the size of the data, and the like.

In addition to maintaining a log of the events involved with the processing of a query, the work-unit reporting module 202 can be adapted to facilitate communication between the components of the system 100. To illustrate, rather than sending a DLL directly to the query agent 104, the query server 102 instead can write the DLL to the associated work-unit on the work-unit reporting module 202. Subsequently, a query agent 104 can obtain the DLL from the corresponding work-unit at the module 202 for further processing. Likewise, one or more of the processing matrices 118–122 may be adapted to store a completion indicator in the corresponding work-unit when the processing matrix completes its portion of the processing for the query as well as an indicator of the location of the results. The other components of the system 100 can be adapted to access the work-unit to determine if a portion of a query has been completed and the location of the results, if any.

Figure 3:
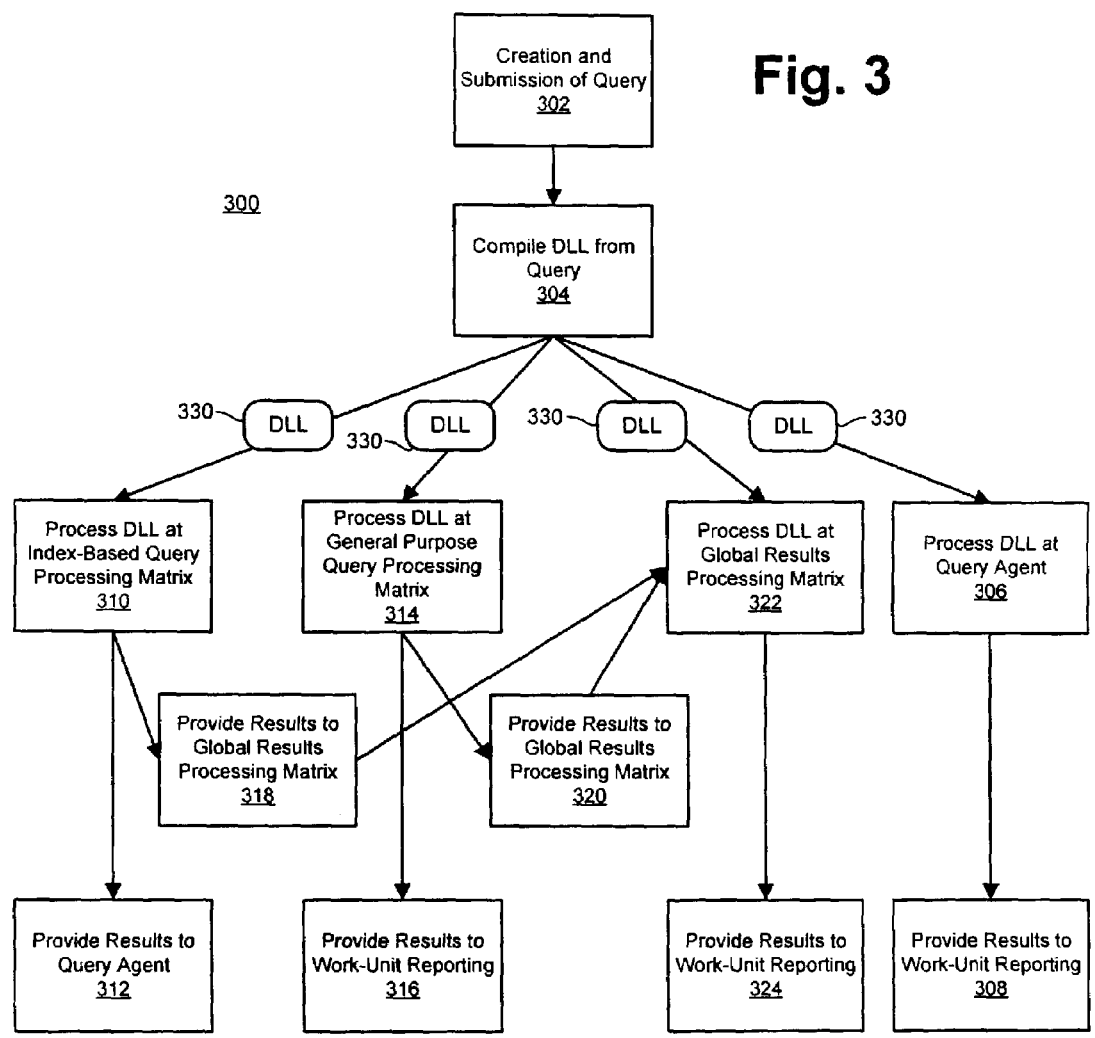
FIG. 3 is a flow diagram illustrating an exemplary method for performing one or more database operations using the system of FIG. 1 in accordance with at least one embodiment of the present invention.

Referring now to FIG. 3, an exemplary method of operation of the system 100 of FIG. 1 is illustrated in accordance with at least one embodiment of the present invention. The exemplary method 300 initiates at step 302 wherein a query is generated and submitted to the query server 102. As note above, the query preferably is represented as ECL source code generated using, for example, the query builder module 106 (FIG. 1). The generation of ECL-based queries is discussed in greater detail below with reference to FIG. 6. Alternatively, the query can be structured using one or more conventional programming languages useful in programming queries, such as SQL, XQL, Java, Perl, C, C++, Fortran, and the like. After the query is generated, it can be formatted into a format suitable for transmission to the query server 102 (FIG. 1), such as an XQL, XML, HTML file, or text file. The formatted query then is transmitted to the query server 102.

At step 304, the query server 102 receives the query and compiles a DLL 330 (or multiple DLLs) from the submitted query. The step 304 preferably includes a series of substeps 402–412, illustrated with reference to FIG. 4. In the event that a query is submitted by a client using an XML template, the query server 102 converts the input of the XML template to an ECL-based query at step 402. At step 404, the query server 102 (FIG. 1) performs a syntax check on the submitted query to ensure that the format of the query is in compliance with the guidelines of the query language (ECL, SQL, XQL, etc.) used to prepare the query. Furthermore, the syntax check can include determining that all attributes, actions, and the like are defined. As noted above, the system 100 can include the repository 110 (FIG. 1). Client-defined attributes can be stored in the repository 110 and then retrieved by the query server 102 when performing a syntax check to confirm that the attributes are properly defined.

At step 406, the definitions for the client-defined attributes are substituted into the query by the query server 102. To illustrate, if the query included the code line:

j:=COUNT(BigDog);

where "COUNT" is a counting operation, the query server 102 could check the repository 110 for the definition of the attribute "BigDog." The attribute "BigDog" could be defined in the repository 110 as:

BigDog:=(animal.species="canine" AND animal.weight>39);

Accordingly, at step 406, the query server 102 could substitute the definition of the attribute "BigDog" into the query, resulting in:

j:=COUNT(animal.species="canine" AND animal.weight>39);

This process can be repeated as necessary for some or all of the attributes of the query. Likewise, the process can be repeated recursively for nested attributes.

At step 408, the query server 102 converts the ECL-based (or SQL/XQL-based) query to intermediary source code in a conventional high-level or medium-level programming language, such as C++, Java, Perl, Fortran, Assembler, and the like. For ease of discussion, the use of the C++ programming language is discussed herein. The query, in one embodiment, is converted to the intermediary source code by using predefined code segments for the components of the query, where the code segments have been developed and refined for execution by the parallel-processing matrices of the computing matrix 116 (FIG. 1). The use and reuse of predefined code segments by the query server 102 often gives incentive for increased scrutiny and review, oftentimes resulting in the code segments used by the query server being more efficient and reliable.

To convert the query to the intermediary source code using predefined code segments, the query server 102 converts the source-code instructions of the submitted query into a parse tree (also known as a syntax tree). The query server 102 then analyzes each node as it traverses the parse tree. At each node, the query server 102 selects the most appropriate predefined code segment based on the analysis of the node. General methods for converting source code using parse trees are well known to those skilled in the arts (see generally, Daniel Friedman, et al., *Essentials of Programming Languages*, (3 ed., McGraw Hill, 1992) and Alfred Aho, et al., *Compilers: Principles, Techniques, and Tools*, (Addison-Wesley, 1986)). Additionally, the query server 102 can be adapted to optimize the parse tree using a number of graph optimization methods, such as well-known graph coloring techniques (see generally, Michael Molloy, et al., *Graph Colouring and the Probabilistic Method*, (Springer Verlag, 2001)).

As described in greater detail below, in one embodiment, each of a subset of the processing nodes of the general-purpose query processing matrix 120 and/or the index-based query processing matrix 122 are adapted to function as a pseudo-SQL database, each processing node of the subset having as its own database a portion of a larger database. Accordingly, the query server 102 can embed one or more SQL statements representative of database operation(s) to be performed by these processing nodes. Upon receipt of the DLL having one or more embedded SQL statements, the master node (discussed below) of the processing matrix 120/122 can be adapted to generate intermediary source code from the embedded SQL statement(s), compile the intermediary source code to generate an executable (e.g., a DLL), and provide the DLL to the subset of processing nodes for execution. Accordingly, step 408 can further include the step of embedding one or more SQL instructions into the intermediary source code as appropriate. The SQL instructions can be embedded in the predefined code segments, added subsequently, and the like. The processing of a DLL having embedded SQL statements is discussed in greater detail with reference to FIG. 5.

At step 410, the intermediary source code preferably is optimized using any of a variety of optimization techniques, such as copy propagation, dead code elimination, reduction variables, strength reduction, and the like. Appendix A illustrates an exemplary ECL-based query and the exemplary intermediary source code (in C++) generated from the ECL-base query based on steps 402–410 as described above.

At step 412, the intermediary source code is compiled by the query server 102 into a DLL (or other type of executable). Since the intermediary source code, in one embodiment, is generated using a common high-level or mid-level programming language (e.g., C++), the query server 102 can utilize a widely-available (i.e., off-the-shelf) compiler to compile the high-level source code. Exemplary compilers for the C++ language that may be implemented by the query server 102 include, for example, the GNU C++ compiler available from http://www.gnu.org, Borland® C++ Compiler 5.5 available from Borland Software Corporation of Scotts Valley, Calif. and Microsoft® Visual C++ .NET compiler available from Microsoft Corp. of Redmond, Wash.

As noted above, queries submitted to a conventional database system often are in the form of an interpreted query language, such as SQL. The client formats a query using SQL and submits the SQL query to a conventional database system, which then employs an SQL interpreter to interpret the code of the SQL query. As the SQL interpreter traverses the parse tree representing the submitted SQL query, the SQL interpreter passes execution to a library representative of the particular portion of the parse tree under consideration. As a result, there is considerable delay as the SQL identifies the proper library, the processor performs a context switch between the interpreter and the library, and performs another context switch between the library and the interpreter when the library has finished executing. Furthermore, the SQL interpreter generally considers only the local portion of the parse tree when selecting a library function for execution and therefore is often unable to optimize the overall process of the query. By adapting the query server 102 to generate an intermediary source code representation of the submitted ECL-based, optimize the intermediary source code, and then compile the intermediary source code into one or more executables, the efficiency problems associated with queries formatted using interpreted query languages can be avoided. Further, by using predefined code segments, considerably improved efficiency, accuracy, and reliability may be achieved compared to custom source code manually generated for each database operation or query.

Referring again to FIG. 3, step 304 of the method 300 continues with the query server 102 providing the DLL 330 to one or more of the processing matrices 118–122 of the computing matrix 116 (FIG. 1) via the query agent 104. Those processing matrices of the computing matrix 116 selected to receive the DLL 330, as well as the order in which the processing matrices receive the DLL 330, is based at least in part on the query submitted. Should the query involve relatively minimal processing, such as searching for the lowest value of 1,000 data entries, the query agent 104 can process the DLL 330 by itself at step 306. As such, the query agent 104 can be viewed as a relatively low-powered component of the computing matrix 116. The results of the execution of part or all of the DLL 330 by the query agent 104 are processed at step 308 and, at step 310, the results may be provided to the client via, for example, the query builder module 106 (FIG. 1), stored in the corresponding work-unit at the work-unit processing module 202 (FIG. 2), stored to disk or tape, provided to one or more of the processing matrices for additional processing, and the like.

In some instances, the submitted query can involve database operations using certain fields that are indexed by the index-based query processing matrix 122 (FIG. 1). Accordingly, the query agent 104 can provide the DLL 330 to the index-based query processing matrix 122 at step 310. The index-based query processing matrix 122 can provide the results of the database operation(s) to the global-results processing matrix 118 at step 318 and/or provide the results to the query agent 104 at step 312.

Some or all of the operations of a submitted query may involve the analysis of relatively large amounts of data. Examples of such database operations can include, but are not limited to, sorting, collating, counting, cleansing, duplicate record resolution (i.e., "deduping"), joining, appending, merging, purging, cleansing, non-hierarchical linking, formatting, and the like. In this case, the query agent 104 can provide the DLL 330 to the general-purpose query processing matrix 120 (FIG. 1) at step 314, whereupon the DLL 330 is executed by the processing matrix 120. The general-purpose query processing matrix 120 is discussed in greater detail with reference to FIGS. 7 and 8.

As with the index-based query processing matrix 122, the results of the execution of the DLL 330 at the general-purpose processing matrix 120 can be stored to disk or tape, provided to the client via the query agent 104, stored to the corresponding work-unit at the work-unit processing module 202, and the like (step 316). In some instances, however, it may be desirable to process the query on multiple processing matrices, where the results generated by one processing matrix are provided to another for additional processing. Particularly, many queries involve one or more database operations performed by the general-purpose query processing matrix 120 and/or the index-based query processing matrix 122 followed by one or more database operations performed by the global-results processing matrix 118 on the results from the processing matrices 120/122. To illustrate, an exemplary submitted query could include a sequence of two database operations. The first operation could include identifying those people having an age greater than thirty years from a criminal records database. The second operation could include sorting the identified people by last name. Accordingly, the identifying operation could be performed by the general-purpose query processing matrix 120 and the identified results provided to the global-results processing matrix 118 in no particular order. The global-results processing matrix 118 then could perform the sort operation on the results provided from the processing matrix 120.

Accordingly, at step 320 the results from one or more database operations performed by the general-purpose query processing matrix 120 are provided to the global-results processing matrix 118. The results can be provided in any of a variety of ways. Preferably, the results stored in the memory of a node of the general-purpose query processing matrix 120 are transferred to the disk storage of a corresponding node of the global-results processing matrix 118. Alternatively, the results could be transferred to storage and the general-purpose query processing matrix 120 could provide a reference to the storage location of the results to the global-results processing matrix 118 directly or via the work-unit processing module 202.

In addition to, or rather than, using two or more types of processing matrices to process a query, the system 100 can be adapted to process the query using two or more of the same type of processing matrices in sequence or in parallel. For example, a query could include two database operations, one operation to identify records having a certain characteristic in one database, and the other operation to identify records having a certain characteristic in another database. Accordingly, the query agent 104 could provide the DLL 330 to one processing matrix 120 to select the records from the first database and provide the DLL 330 to another processing matrix 120 to select the records from the second database. In another example, a query could include two database operations, one operation to identify records of a large database having a certain characteristic, and another operation to identify those records identified by the first operation as having a second characteristic. In this case, the query agent 104 could be adapted to supply the DLL 330 to a first processing matrix 120 having a relatively large number of processing nodes to identify the records having the first characteristic. The identified records and the DLL 330 then could be supplied to a second processing matrix 120 to identify those records from the first processing matrix 120 that have the second characteristic.

Some or all of the database operation(s) of a submitted query may be beneficially performed by the global-results processing matrix 118, either separately or in conjunction with the results generated by another processing matrix of the computing matrix 116. Accordingly, the query agent 104 can provide the DLL 330 to the global-results processing matrix 118. At step 322, the global-results processing matrix 118 can execute some or all portions of the DLL 330 using the results generated by another processing matrix, data previously distributed to the nodes of the global-results processing matrix 118, or a combination thereof. At step 324, the results of the execution of the DLL at the global-results processing matrix 118 can be stored to disk or tape, provided to the client via the query agent 104, stored to the corresponding work-unit at the work-unit processing module 202, provided to another processing matrix of the computing matrix 116, and the like. The operation of the global-results processing matrix 118 is discussed in greater detail with reference to FIGS. 9 and 10.

Figure 5:
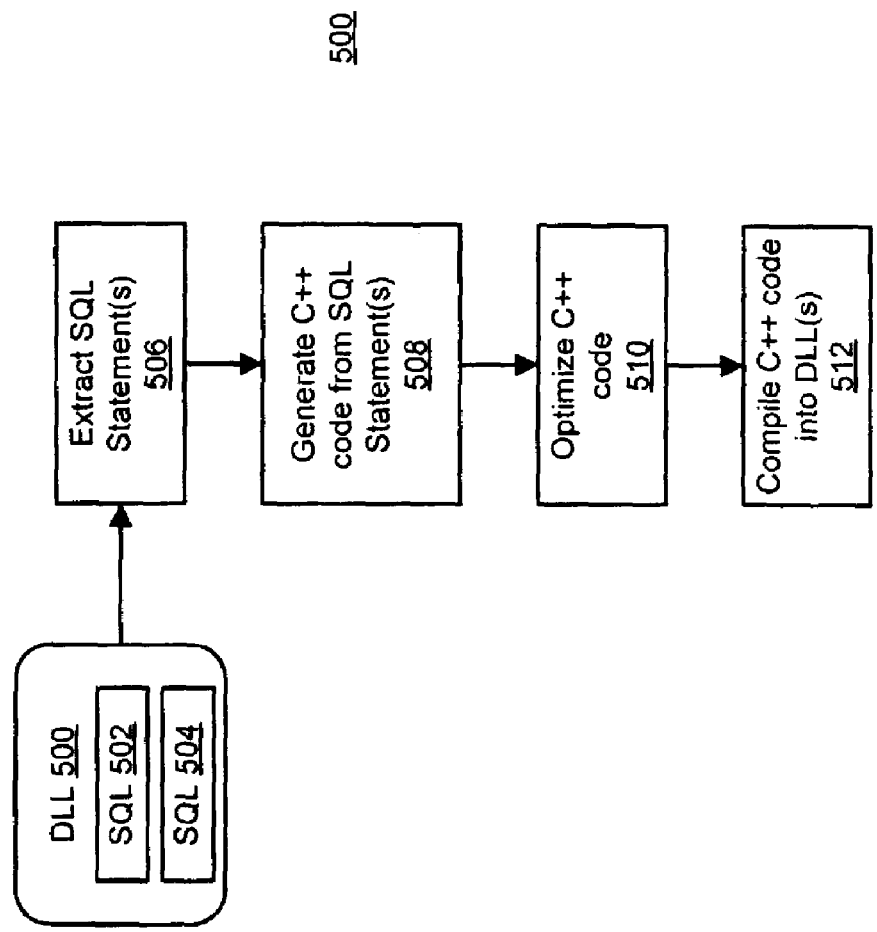
FIG. 5 is a flow diagram illustrating an exemplary method for generating a second compiled executable from a first executable having at least one embedded query-based language instruction in accordance with at least one embodiment of the present invention.

Referring now to FIG. 5, an exemplary method 500 for generating a second DLL from a DLL having embedded SQL instructions is illustrated in accordance with at least one embodiment of the present invention. As noted above, certain processing nodes of the processing matrix 120/122 may be adapted to function as individual database systems on their individual portion of a database. Accordingly, it may be beneficial to embed in the DLL 500 supplied to the matrix 120/122 one or more SQL statements 502, 504 representative of the database operation(s) the processing nodes are to perform on their respective database portion. The master node of the matrix 120/122 may then implement exemplary method 500 to generate a second DLL for use by the certain processing nodes.

Figure 4:
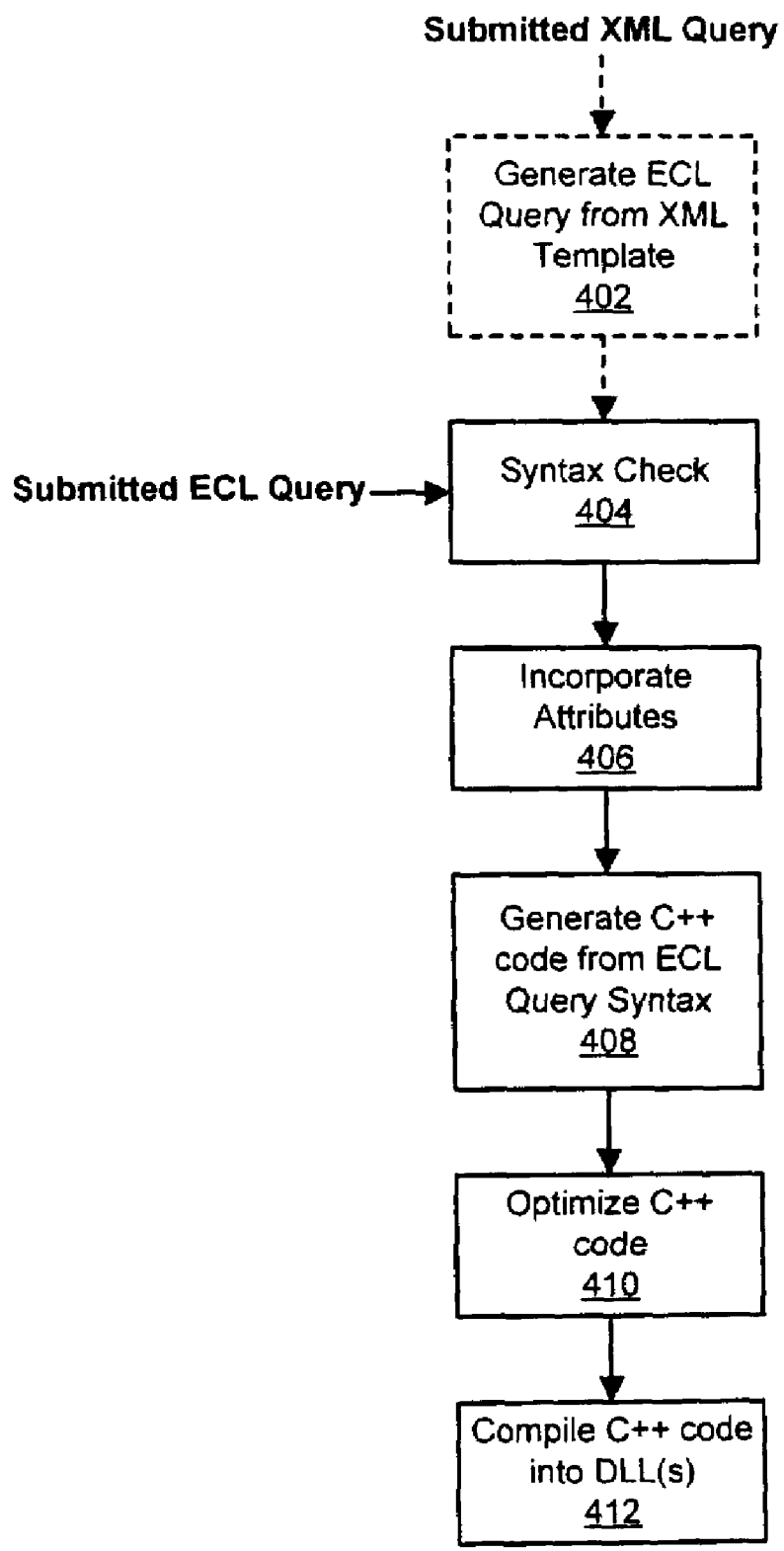
FIG. 4 is a flow diagram illustrating an exemplary method for generating a compiled executable from a set of query-based language instructions in accordance with at least one embodiment of the present invention.

Method 500 initiates at step 506, whereby the master node (master node 702, FIG. 7) of the matrix 120 (or matrix 122) is adapted to identify and extract the SQL statements 502, 504 from the DLL 500. At step 508, the SQL statements are converted into a parse tree and the master node traverses the parse tree to generate intermediary source code (e.g., C++ source code), preferably using predefined code segments as with step 408 (FIG. 4). At step 510 (analogous to step 410, FIG. 4), the intermediary source code is optimized and then compiled into machine-level code at step 512 (analogous to step 412, FIG. 4). The newly generated DLL may then be provided to the subset of processing nodes for execution, as discussed in greater detail with reference to FIGS. 7 and 8.

Figure 6:
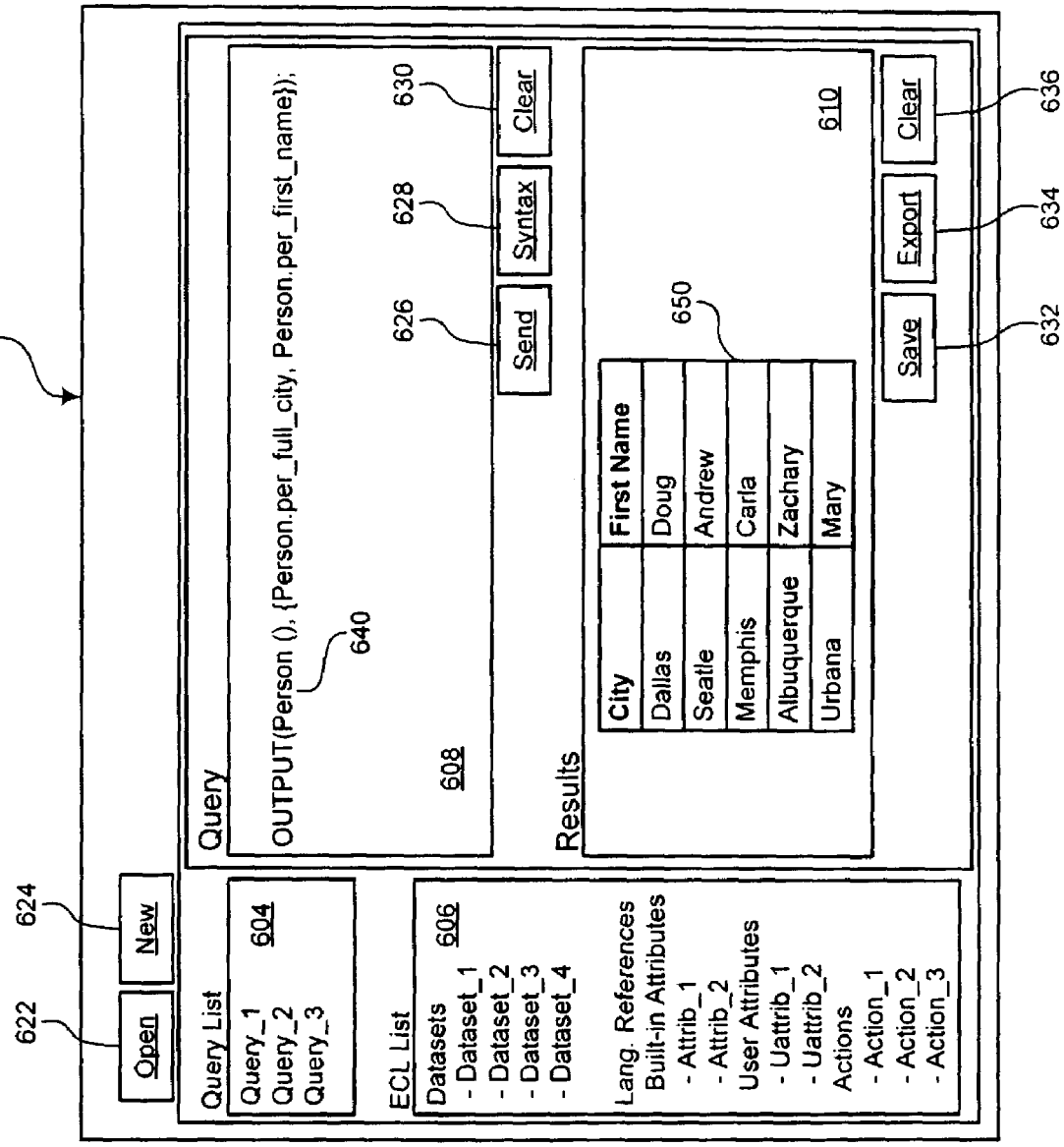
FIG. 6 is a block diagram illustrating an exemplary graphical client interface for creating a query from a query-based programming language in accordance with at least one embodiment of the present invention.

Referring now to FIG. 6, an exemplary implementation of the query builder module 106 (FIG. 1) is illustrated in accordance with at least one embodiment of the present invention. As discussed above, the query builder module 106 can include any of a variety of interfaces adapted to receive query input from a client. In one embodiment, the query builder module 106 includes a GUI 602 adapted to facilitate the programming of a client using ECL.

In the illustrated example, the GUI 602 includes a query list window 604, an ECL reference list window 606, a query code window 608, a results display window 610, and a variety of client-selectable objects (i.e., "buttons"), such as open button 622, new button 624, send button 626, syntax button 628, clear button 630, save button 632, export button 634, and clear button 636. The query list window 604 includes a graphical listing of queries previously generated and/or submitted for processing. The query code window 608 is adapted to graphical display the ECL code associated with a query listed in the query list window 604. To open a previously-generated query, the client may select one of the queries listed in the query list window 604 by, for example, selecting the corresponding query name listed in the window 604 with a mouse, keyboard, or other client-input device. Alternatively, the client could select the open button 622 locate and load a previously-generated query.

To generate or modify a query, a client can use the ECL code window 608 to add, delete or modify the ECL code representing the query. The ECL reference list window 606 can be used to navigate the attributes, actions, constants, operators, and other elements of ECL. Further, the GUI 602 can be adapted to include an element of ECL in the ECL code displayed in the window 608 when the element is selected from the ECL reference list window 606 using a client-input device.

After generating or modifying ECL code 640 representative of part or all of a desired query, the client can select the syntax button 628 to direct the query builder module 106 (FIG. 1) to perform an ECL syntax check on the ECL code 640 in the ECL code window 608. If the syntax is correct and the client is satisfied with the query, the client can select the send button 626 to submit a representation of the ECL code 640 to the query server 102 (FIG. 1) for processing as a query. Alternatively, the client can select the clear button 630 to clear the ECL code 640 from the ECL code window 608.

In some instances, a submitted query may be formatted to return certain results to the client. These results can be received by the query builder module 106 and the results (results 650) then displayed in the appropriate format in the results display window 610. In at least one embodiment, the GUI 602 is adapted to provide for display (in the same window 610 or a separate window) the raw data associated with an element of the results selected by the client. The client may chose to save the results by selecting the save button 632, export the results as a particular file type (e.g., a Microsoft Excel spreadsheet) by selecting the export button 634, or clear the displayed results from the window 610 using clear button 636.

It should be understood that the results may be displayed in a variety of ways, which may be user-definable or user-selectable, e.g., subject profile, composite report, summary report, continuous string, and others. Additional tools may be provided to tenable the user to manipulate, edit, and perform other tasks, on the results. The user may also edit the search parameters, perform additional searches or take other desirable actions.

The GUI 602 may be further understood by considering the following example. In this example, a client desires to display an unsorted list of the people having entries in the "Persons" data set by the person's city and by the person's first name. The client can select the "OUTPUT" action from the Actions section (generally represented as one of Action_ 1–Action_3) of the ECL reference list window 606, whereby the "OUTPUT" action includes an ECL action directing the output of entries in an identified data set that meet indicated criteria. The client can identify the "Persons" data set by selecting it from the data set section of the ECL reference list window 606 and indicate the certain criteria (i.e., output by city and first name) by selecting the "Person.per_full_city" and "Person.per_first_name" fields of the "Persons" database as listed in the attributes section of the ECL reference list 606. The resulting ECL code 640 would then be:

OUTPUT(Person( ), {Person.per_full_city, Person.per_first_name});

The client could check that the syntax is correct by selecting the syntax button 628 and then submit the ECL code 640 to the query server 102 for processing by selecting the send button 626.

The query server 102 then generates a DLL representing the submitted query and provides the DLL to the query agent 104 (FIG. 1) for processing by the computing matrix 116. The query agent 104 then supplies the results to the query builder module 106, whereby the city and last name of each person of the "Persons" data set are displayed as a two-column matrix (results 660) in the results display window 610.

Figure 7B:
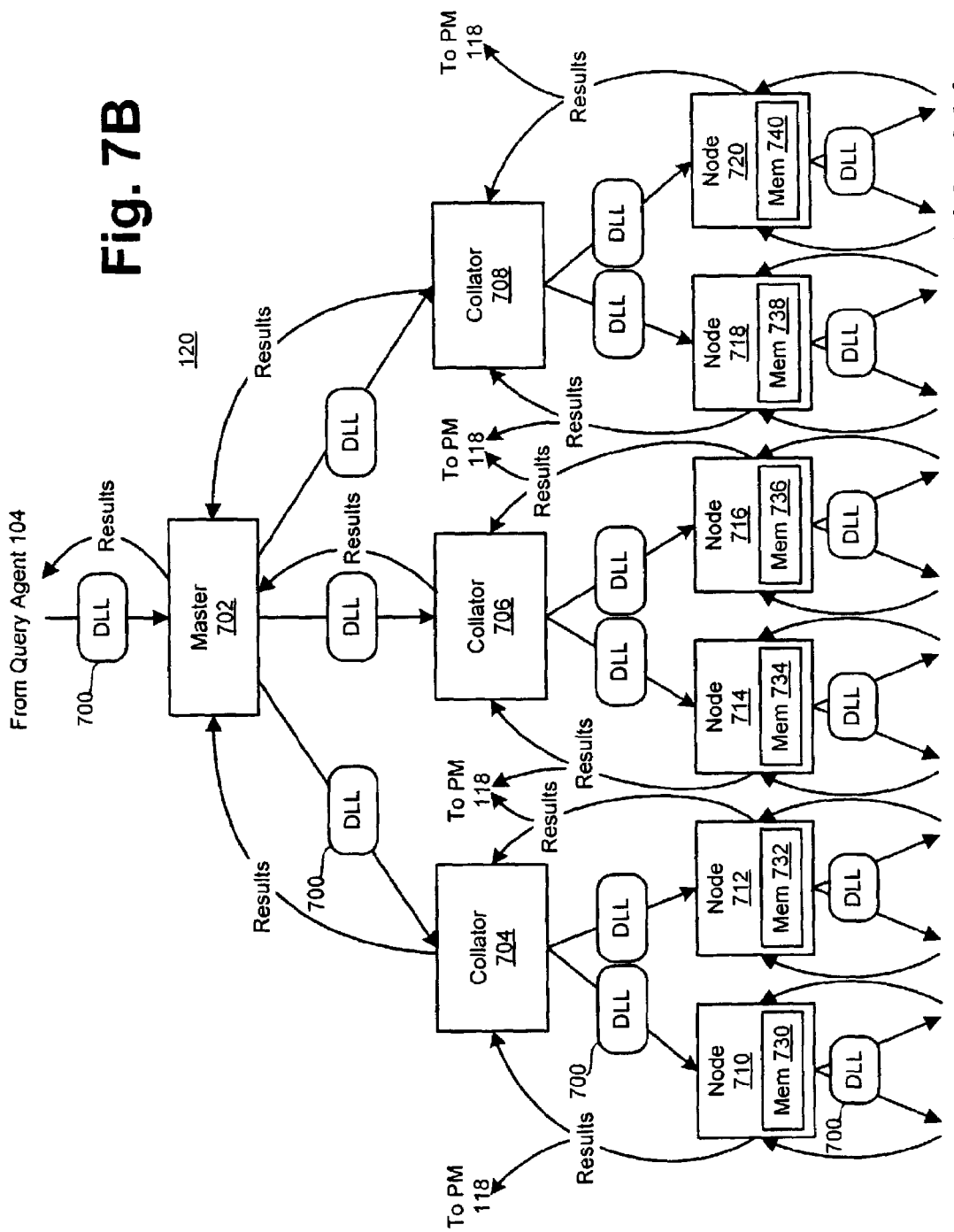

Referring now to FIGS. 7A, 7B, and 8, an exemplary implementation and operation of the general-purpose query processing matrix 120 are illustrated in accordance with at least one embodiment of the present invention. In the illustrated embodiment of FIG. 7A, the processing matrix 120 includes a plurality of interconnected processing nodes 702–720 operating in parallel. Each node includes at least one processor and memory accessible by the processor(s) of the node. Each node also may include one or more storage devices, such as disk storage, tape drives, and the like. In a preferred embodiment, a processing node includes a common general-purpose microcomputer configuration having a motherboard, one or more processors, random access memory (RAM), one or more disk drives, a network interface, as well as various support components, such as read only memory (ROM), direct memory access (DMA) controller, various busses, and the like. An exemplary implementation could include, for example, a PC clone-based motherboard having an Intel® Pentium® III processor and 2 GB of RAM; two 32 GB EIDE or SCSI hard disk drives; and an Ethernet network interface card (NIC).

The nodes of the processing matrix 120 preferably are logically arranged in an n-ary tree structure of N levels. The node at the root of the tree is designated as the master node and each node at the bottom level of the tree structure is dedicated as a slave node. Those nodes at intermediate levels of the tree between the top level and the bottom level are designated as collator nodes. In the illustrated example, the processing matrix 120 includes three levels, where the master node 702 is located at the first level, collator nodes 704–708 are located at the second level, and slave nodes 710–720 located at the third level. Alternatively, if the processing matrix 120 included, for example, four levels, the nodes 710–720 also would be collator nodes and the children of the nodes 710-720 would then be the slave nodes. Note that although FIGS. 7A, 7B illustrates an exemplary implementation of the processing matrix 120 having a three-level tree structure where the parent to child ratio for the master node is 1:3 and 1:2 for the master node collator nodes, respectively, any number of tree levels and/or any ratio or combination of ratios of parent node to children nodes may be implemented without departing from the spirit or the scope of the present invention.

In one embodiment, the master node 702 is adapted to prepare the processing matrix 120 for processing a DLL/SQL query received from the query agent 104; to distribute the DLL to its children; and to process the results supplied from its children. The slave nodes of the processing matrix 120 can be viewed as the "workhorses" of the processing matrix 120 by performing the processing-intensive operations of the submitted query. Each collator node between the slave nodes and the master nodes manages the results from its children and then provides the results of its processing to its parent node, which may include another collator node or the master node. The master node then processes the results from its children nodes.

In at least one embodiment, each node of the processing matrix 120 executes the same software application, referred to herein as a "homogenous agent" or "HomAgent". In one embodiment, the HomAgent is adapted to receive a DLL; dynamically link to a specified portion of the DLL while operating; and execute the specified portion of the DLL. It will be appreciated, however, that after executing multiple DLLs in this manner, there is the potential for corruption of the memory space of the HomAgent. Accordingly, in another embodiment, rather than linking to and executing the specified portion, the HomAgent invokes another process to link to and execute the specified portion of the DLL. For ease of discussion, reference to the HomAgent executing a DLL or performing another act also extends to the execution of the DLL or the execution of the act by a process invoked by the HomAgent, unless otherwise noted.

The relationship between the HomAgent and the DLL can be viewed as analogous to the relationship between, for example, a word processor application and a device driver (i.e., a type of DLL) for a printer. When the word processor is directed to output a document to a printer for printing, the word processor invokes generic print commands. These generic print commands in turn are dynamically linked to the printer-specific device driver that directs the operation of the printer. As such, the word processor can be adapted to print to a plurality of different printers by engaging device drivers specific to each printer. In the same manner, the HomAgent allows each node to perform a wide variety and combination of operations by using generic commands that are dynamically linked to specific portions of the DLL. The operations coded in different entry portions of the DLL determine the specific operations performed by a particular HomAgent. The HomAgent is discussed in greater detail with reference to FIGS. 12–13.

In at least one embodiment, each slave node 710–720 operates essentially as a separate database management system on a respective portion of one or more databases 742. Accordingly, in one embodiment, the global-results processing matrix 118 segments the database 742 into separate database portions 750–760 and then distributes the portions 750–760 among the slave nodes 710–720 prior to the processing of one or more database operations on the database 742. Any of a variety of distribution techniques may be implemented to distribute the data of the database 742. The data of the database 742 may be, for example, equally distributed among the nodes 710–720 by providing the first x records of the database 742 to node 710, the next x records of the database 742 to the node 712, and so on. In this example, x represents the total number of records divided by the number of slave nodes (six in this case), across which the records are to be distributed.

In many instances, however, it is desirable to randomly, rather than sequentially, distribute the data of the database 742 across the nodes 710–720. Accordingly, the global-results processing matrix 118 can be adapted to use of one or more hash functions on one or more fields of the records of the database 742. For example, the database 744 could represent a credit history database, each record of the database having a social security number field, a name field, an address field, and a number of credit-related fields. In this example, the records could be distributed among the nodes 710–720 using a hash function keyed to the social security number associated with each record. The distribution of the database 744 is illustrated in greater detail with reference to FIGS. 14 and 15.

In at least one embodiment, the data portions 750–760 of the database 742 are stored in the memory of the corresponding slave node (memory 730–740), which preferably comprises random access memory (RAM). The slave nodes then perform database operation(s) using the data distributed into their memories. It will be appreciated that memory accesses typically are much faster than disk storage accesses, and are often at least two to three orders of magnitude faster. Accordingly, database operations performed by the slave nodes typically can be performed much faster than those performed by conventional database query systems that process queries from data stored in non-volatile storage, such as hard disk, tape, optical disk, and the like. The distribution of data into node memory from one or more databases is discussed in greater detail below with reference to FIGS. 14–15.

FIGS. 7B and 8 illustrate an exemplary operations 800 of the general-purpose query processing matrix 120. Using the exemplary method 300 (FIG. 3), the query server 102 generates a DLL 700 and provides the DLL 700 to the master node 702 of the processing matrix 120. In the illustrated example, the DLL includes three portions A–C, each portion to be executed by processing nodes of a specified level of the tree. The HomAgent at the master node 702 (or a process invoked by the HomAgent), upon receipt of the DLL 700, is configured to execute portion A of the DLL 700 (step 801, FIG. 8). Portion A may direct the HomAgent of the master node 702 to generate a new DLL from SQL instructions embedded in the DLL 700 (method 500, FIG. 5) and provide the new DLL to the collators 704–708 (step 802, FIG. 8). Alternatively, portion A may direct the HomAgent of the master node 702 to directly transfer a copy of the DLL 700 to each of the collators 704–708. For ease of discussion, subsequent reference to the DLL 700 refers to either the original DLL 700 from the query agent 104 or the DLL 700 generated by the master node 702 from the original DLL unless otherwise indicated.

Upon receipt of the DLL 700 (or a newly generated DLL), the HomAgent at each collator node 704–708 is adapted to execute portion B of the DLL 700 substantially in parallel (steps 804–808, FIG. 8), where portion B may direct the HomAgent of each collator node 704 to provide a copy of the DLL to each of the collator node's children nodes. The step of providing the DLL from parent node to its children nodes is repeated until the DLL is received by the slave nodes at the lowest level of the tree, in this case, the slave nodes 710–720. The HomAgent at each of the slave nodes 710–720, in turn, is configured to execute portion C of the DLL 700 substantially in parallel (steps 810–820, FIG. 8). In this case, the portion C of the DLL 700 represents the one or more database operations to be performed by the slave nodes 710–720 on their respective database portions. This portion of the DLL typically includes the processor-intensive operations of the submitted query, such as performing complex calculations, locating certain data in the data set at each node, evaluating complex boolean expressions, and the like, all on a relatively large number of data set entries.

In one embodiment, the slave nodes 710–720 transmit their results in parallel to one or more the global-results processing matrices 118 (steps 840–850, FIG. 8). As discussed in greater detail below, in one embodiment the global-results processing matrix 118 is implemented as a two-level tree having a single master node and a plurality of slave nodes. Accordingly, the slave nodes 710–720 of the general-purpose query processing matrix 120 can be adapted to directly transfer their results to one or more slave nodes of the global-results processing matrix 118. The results from a slave node of the general-purpose query processing matrix 120 can be allocated to the slave nodes of the global-results processing matrix 118 in any of a variety of ways. With consideration to the storage capacity of the slave nodes of the processing matrix 118, the results from each of slave nodes 710–720 can be distributed among some or all of the slave nodes of the processing matrix 118, all of the results could be concentrated in one or more slave nodes of the processing matrix 118, subsets of the slave nodes 710–720 could be associated with each of the slave nodes of the processing matrix 118, and the like.

Method 800 typically is implemented in a query wherein the results of one or more database operations by the general-purpose query processing matrix 120 receive further processing by the global-results processing matrix 118. To illustrate, consider the following exemplary query:

*j*=JOIN(Persons.age>20, Cars.color="blue");

where the operation "JOIN" results in the generation of a new dataset "j" that represents the union of the entries of the dataset "Persons" having an "age" value greater than 20 and those entries of the "Cars" dataset having a "color" value equal to "blue". In this example, the computing matrix 116 of system 100 (FIG. 1) includes two general-purpose query processing matrices 120 and a global-results processing matrix 118. Accordingly, the exemplary query above could be constructed by the query server 102 (FIG. 1) into three database operations:

FETCH(Persons, Persons.age>20, Query Processing Matrix 1);

FETCH(Cars, Cars.color="blue", Query Processing Matrix 2);

JOIN(*j*, Global-Results Processing Matrix 1); . . .

The first "FETCH" operation being assigned for processing by one of the general-purpose query processing matrices 120 and the second "FETCH" operation being assigned for processing by the other general-purpose query processing matrices 120. The results of the "FETCH" operations by the processing matrices 120 are provided to the global-results processing matrix 118, whereupon the global-results processing matrix joins the results into a single data set "j".

The operation of the processing matrix 120 may be better understood by considering the following example. In this example, a query for the last names of the ten oldest people in a motor vehicle registration database of 60,000 entries is submitted to the processing matrix 120. At a prior time, the 60,000 records of the database 742 are randomly, but evenly, distributed among the memories 730–740 of the slave nodes 710–720, each memory storing 10,000 records. A DLL 700 representing the query is generated by the query server 102 (FIG. 1) and then provided to the processing matrix 120, where the DLL 700 then is distributed down the tree levels of the processing matrix 120 to the HomAgents of the slave nodes 710–720. Upon receipt of the DLL 700, the HomAgents of the slave nodes 710–720 (or processes spawned by the HomAgents) each execute the portion of the DLL 700 associated with the slave nodes, whereby each HomAgent is directed by the portion of the DLL 700 to identify the ten oldest people from the 10,000 entries stored in the memory of the slave node. Each slave node returns ten entries corresponding to the ten oldest people in the slave node's portion of the database to its parent collator node.

The results from the slave nodes are stored in the memory of the parent collator node. The HomAgents at the collator nodes 704–708 then each execute the collator portion of the DLL 700 substantially in parallel, whereby the HomAgent is directed to identify and return ten entries corresponding to the ten oldest people of the twenty entries received from its child slave nodes (ten entries from each slave node). The identified entries of the ten oldest people at each collator are stored in the memory of the master node 702. As directed by the master node entry portion of the DLL 700, the HomAgent at the master node 702 then identifies the ten entries corresponding to the ten oldest people of the thirty entries received from the collator nodes 704–708 and provides these entries to the query agent 104 for transmission to the client and/or stores these ten entries in the corresponding work-unit, e.g., work-unit 202 of FIG. 2. The master node portion of the DLL 700 also could direct the HomAgent of the master node 702 to perform one or more additional operations on the ten entries before transmitting them to the query agent 104, such as sorting the ten entries by last name.

Referring now to FIGS. 9 and 10, an exemplary implementation and operation of the global-results processing matrix 118 is illustrated in accordance with at least one embodiment of the present invention. In the illustrated embodiment of FIG. 9, the global-results processing matrix 118 includes a bi-level tree architecture having a master node 902 connected to one or more slave nodes 912–918. Additionally, each slave node preferably is connected to at least one other slave node via a network and more preferably is connected to every other slave node of the processing matrix 118. As with the processing matrix 120, in at least one embodiment, each processing node of the processing matrix 118 executes the same HomAgent software application.

As noted above, in one embodiment, the results generated by one or more processing matrices 120/122 are stored to the slave nodes 912–918 for further processing by the global-results processing matrix 118. Alternatively, in one embodiment, a database 942 is segmented into separate database portions 952–960 and the portions distributed among the slave nodes 912–918 prior to the processing of one or more database operations on the database 942. Any of a variety of distribution techniques 944 (the same or similar to distribution technique 744, FIG. 7) may be implemented to distribute the data of the database 942, such as randomly distributing the records of the database 942 using, for example, a hash function.

Rather than storing the database portions or query results in the memory at the slave nodes 912–918 like the processing matrix 120 (FIG. 7), in at least one embodiment, the data portions 952–960 of the database 942 and/or query results from slave nodes of matrices 120/122 are stored on a storage device of the corresponding slave node (disk storage 922–928), such as on a disk drive, tape drive, and the like. The slave nodes then perform database operation(s) using the data stored in the storage devices. While accessing data from a storage device is considerably slower than memory data accesses, it will be appreciated that storage devices typically are capable of storing considerably larger amounts of data than typical RAM memories. Further, for equal storage capacity, disk storage is considerably cheaper than memory technologies. Accordingly, the slave nodes 912–918 can store considerably larger data portions using disk storage 922–928 than the slave nodes 710–720 of the processing matrix 120 (FIG. 7) implementing memory 730–744 to store all or a significant amount of their respective database portions. The distribution of data into node disk storage from one or more databases is discussed in greater detail below with reference to FIGS. 14–15.

Figure 9B:
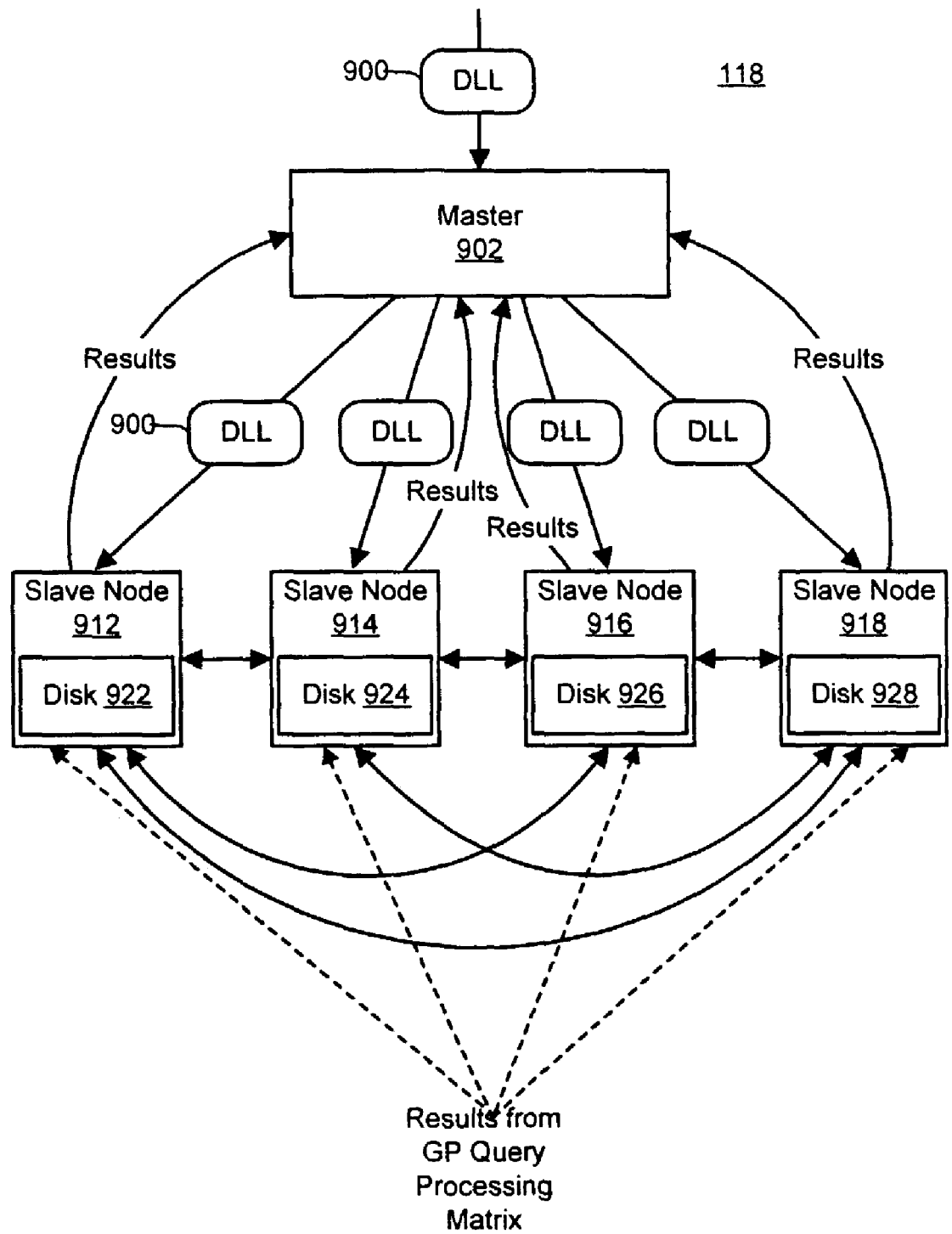
Figure 10B:
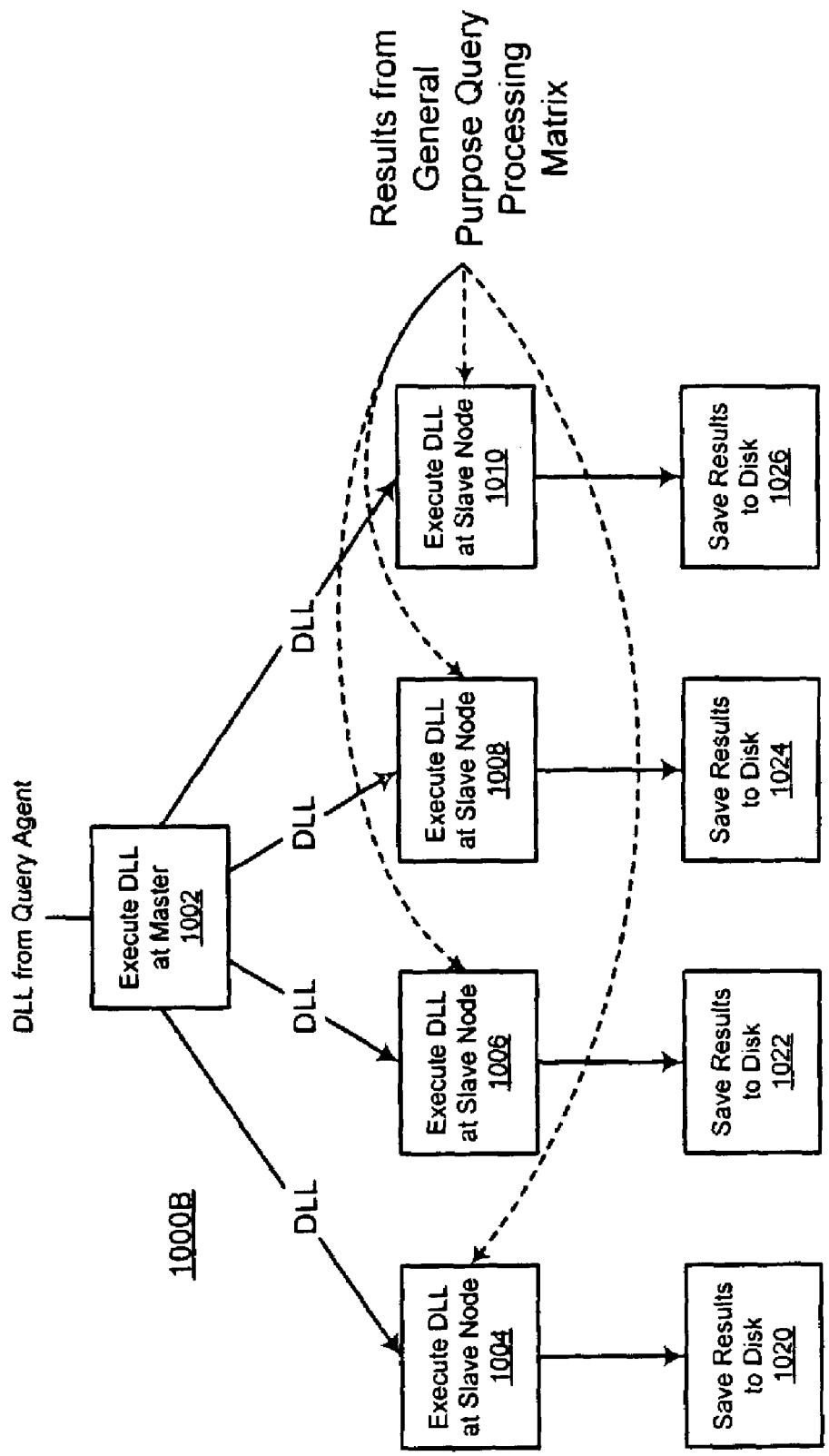

Referring now to FIGS. 9B, 10A and 10B, exemplary operations of the global-results processing matrix 118 are illustrated. As with the master node 702 of the processing matrix 120 (FIG. 7), the master node 902 of the processing matrix 118 is adapted to receive a DLL 900 having portions A and B from a query agent 104 (FIG. 1). The HomAgent at the master node 702 executes portion A of the DLL 900 and, in the process of execution, distributes a copy of the DLL 900 to the slave nodes 912–918 (step 1002, methods 1000A and 1000B). The HomAgents for the slave nodes 912–918 each then execute portion B of the DLL 900 (steps 1004–1010, methods 1000A and 1000B), where portion B represents the one or more database operations to be performed on the database portions stored in the disk storage 922–928 of the slave nodes. Recall that in some instances, the database operations performed by the slave nodes 912–918 may be performed, in whole or in part, on the results from one or more general-purpose query processing matrices 120 and/or index-based query processing matrices 122.

For some database operations, the results of the execution of the assigned DLL portion are provided to the master node 902 for additional processing (step 1012, method 1000A). The master node 902 then provides the results to the query agent 104 for storage in the work-unit processing module 202 (step 1014, method 1000A) and/or distribution to the client via, for example, the query builder 106 (step 1016, method 1000A). For example, certain database operations that are expected to return a relatively small amount of data may be returned via the master node 902. Alternatively, the slave nodes 912–918 may be adapted to directly store their query results in the corresponding work-unit at the work-unit reporting module 202 (FIG. 2) or may store their query results at one or more data stores and supply the corresponding work-unit with a reference to the storage location(s) of the query results.

The transfer of the raw results to the client may prove unduly burdensome for some database operations or the results of one database operation may be used subsequently by another database operation at the global-results processing matrix 118. Accordingly, in one embodiment, the results of these types of queries are stored to non-volatile storage (e.g., disk drives 922–928) of the slave nodes 912–918 (steps 1020–1026, method 1000B).

In at least one embodiment, a significant difference between the global-results processing matrix 118 and the general-purpose query processing matrix 120 is that data operated on by the general-purpose query processing matrix 120 is stored in memory prior to processing of a submitted DLL, whereas the global-results processing matrix 118 can be adapted to distribute data from the non-volatile storage to the memory of the slave nodes 922–928 depending on the nature of the database operation. As a result, the general-purpose query processing matrix 120 is able to process more quickly due to the relative speed of memory accesses. However, because the data typically must be in the memory of the nodes prior to executing a database operation, the general-purpose query processing matrix 120 typically is limited to performing operations on hierarchical data, thereby ensuring that related data is on the same node. Conversely, the global-results processing matrix 118 operates at a slower speed due to the delay in non-volatile storage accesses, but generally is not constrained to only hierarchical data, as the data may be distributed from the non-volatile storage of each slave node to other slave nodes or from external storage to the slave nodes.

Figure 11A:
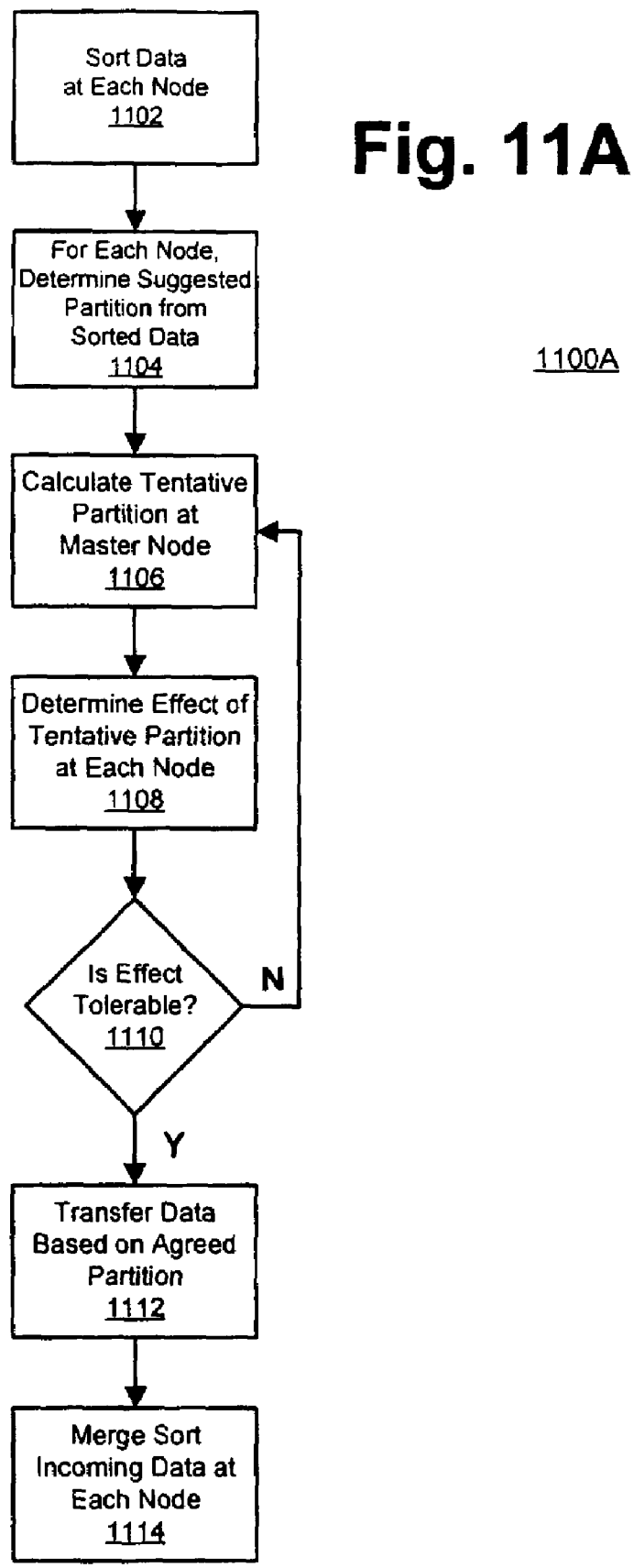
FIGS. 11A and 11B are flow diagrams illustrating exemplary methods for sorting data across multiple nodes of the global-results processing matrix of FIG. 9 in accordance with at least one embodiment of the present invention.
Figure 11B:
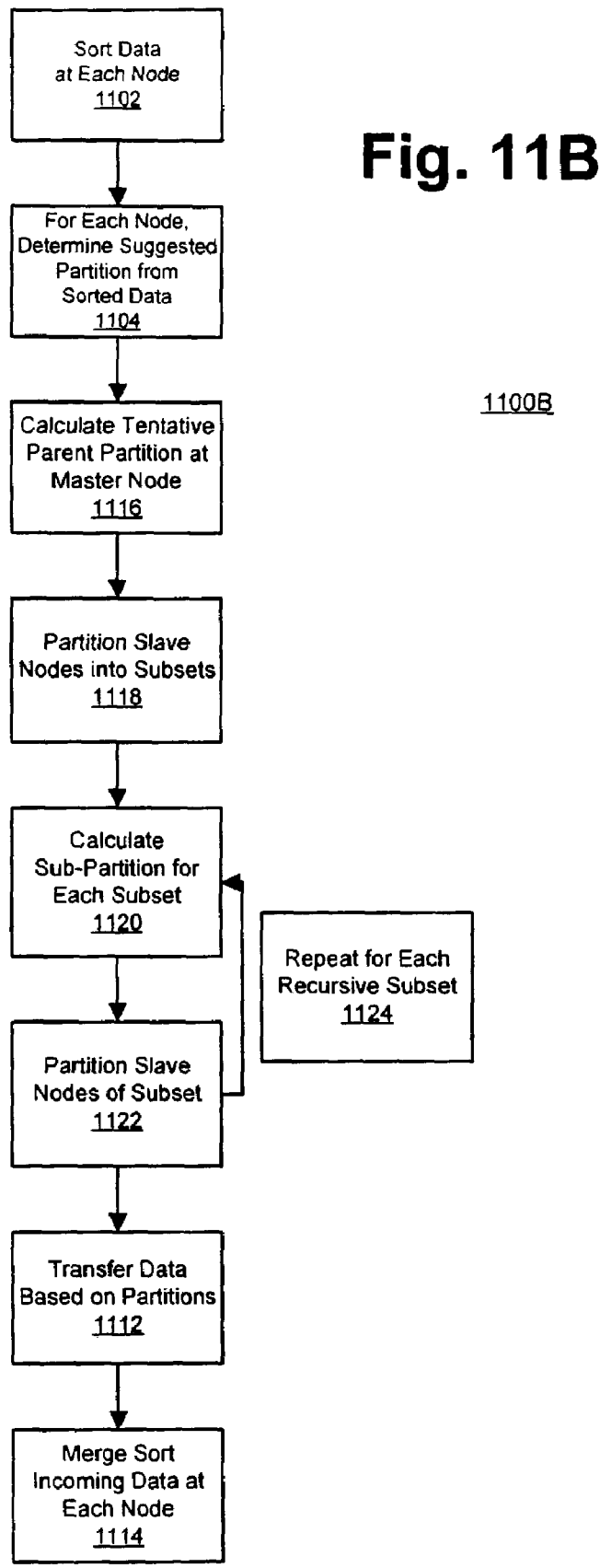

Referring now to FIGS. 11A–11C, various exemplary methods for partitioning data between slave nodes of the global-results processing matrix 118 are illustrated in accordance with at least one embodiment of the present invention. In many instances, the results generated by a previous database operation may need to be resorted for the following database operation. To illustrate, consider a database operation that is to be based on the records of a data set that are sorted by last name, but the results from the previous database operation are sorted by zip code. In this case, the data needs to be partitioned across the slave nodes of the global-results processing matrix 118 such that records having the same or similar last name are stored on the same slave node. Methods 1100A and 1100B demonstrate various methods to perform such partitioning.

Method 1100A of FIG. 11A initiates at step 1102, whereby each slave node of the processing matrix 118 sorts its database portion based on a specified sorting criteria (i.e., by last name). At step 1104, each slave node generates an estimated partitioning of the data set across all slave nodes of the processing matrix 118. In one embodiment, each slave node is adapted to develop its estimated partitioning of the data set over the slave nodes by analyzing its database portion and extrapolating this analysis to represent all of the database portions of the slave nodes. To illustrate, assume that the global-results processing matrix 118 includes three slave nodes and a database is distributed among the three slave nodes. One of the slave nodes sorts its own database portion and determines that its database portion of 30,000 records can be equally distributed in three "buckets" of 10,000 records apiece by partitioning the buckets into last names starting with the letter "A–D", "E–P", and "Q–Z". However, because the database is unlikely to be perfectly randomly distributed, the other slave nodes are likely to come up with a different estimated partitioning from their data. For example, the second slave node could determine that, based on its data, an equitable partitioning scheme for the three "buckets" would be "A–G", "H–M", and "N–Z" (each "bucket" having 10,000 records). The third slave node could determine from its sorted data portion an equitable partitioning scheme of "A–C", "D–L", and "M–Z" for each of the three "buckets" (each having 10,000 records).

Since each slave node is likely to have an at least slightly different partitioning scheme from the other slave nodes, each slave node submits its suggested partitioning scheme to the master node. Each slave node also sends an indication of the number of records from its own data portion that fall within each "bucket" of its suggested partitioning scheme.

At step 1106, the master node determines a tentative partitioning scheme for the entire database distributed among the slave nodes. The tentative partitioning scheme can be determined in any of a variety of ways, such as: linear interpolation; determining the harmonic mean or arithmetic mean; and other acceptable techniques. One of the considerations when determining the tentative partitioning scheme may include the prevention of unequal distribution of the database among slave nodes. If the data is significantly unequally distributed, the overall efficiency of the processing matrix 118 may suffer. Likewise, a tentative partitioning could result in more data being allocated to a slave node than the slave node is capable of storing. Accordingly, another factor that may be considered by the master node is individual node capacity to prevent overcapacity conditions or bring in additional nodes if necessary to most effectively partition the database.

After determining a tentative partitioning scheme, the tentative partitioning scheme is submitted to the slave nodes and each slave node evaluates how the records of its data portion would be distributed using the tentative partitioning scheme at step 1108. Each slave node then notifies the master node of the number of records of its data portion that would be distributed to each "bucket" of the tentative partitioning scheme at step 1108. Using the responses of the slave nodes, the master node determines the effect of the tentative partitioning scheme at step 1110. If the effect is tolerable (i.e., the data is relatively equally distributed, no single slave node is over capacity, etc.), the master node can elect to use the tentative partitioning scheme to partition the data. Otherwise, the master node revises the tentative partitioning scheme based on the responses from the slave nodes at step 1106 and steps 1106–1108 are repeated until an acceptable or optimal partitioning scheme is determined. Additionally, or in the alternative, the slave nodes can provide more detailed information concerning the breakdown of the initial data portion, such as the number of records for each letter A–Z.

After an acceptable partitioning scheme is determined, each slave node transfers data in its data portion that does not fall within its assigned partition range to the slave node having the appropriate partition range at step 1112. Using the previous example, assume that a tolerable partitioning scheme where the first slave node is assigned all records having last names starting with the letters "A–F", the second slave node is assigned all records having last names starting with the letters "G–K", and the third slave node is assigned all records having last names starting with the letters "L–Z". Accordingly, the first slave node transfers those records of its data portion having last names starting with the letters "G–K" to the second slave node and transfers those records of its data portion having last names starting with the letters "L–Z" to the third slave node. The second slave node transfers those records of its data portion having last names starting with the letters "A–F" to the first slave node and transfers those records of its data portion having last names starting with the letters "L–Z" to the third slave node. The third slave node transfers those records of its data portion having last names starting with the letters "A–F" to the first slave node and transfers those records of its data portion having last names starting with the letters "G–K" to the second slave node. In at least one embodiment, the slave nodes are adapted to utilize one or more data compression techniques to compress data outside of its assigned partition prior to transmitting the data to the other slave nodes. At step 1114, each slave node merge sorts the incoming data records from the other slave nodes during the partitioning of the data set. If the data was compressed by the sending slave node prior to transmission, the receiving slave node can be adapted to decompress the data prior to merge sorting the incoming data. As a result, at the termination of step 1114, each slave node has a portion of the data set that is sorted by last name.

Referring now to FIG. 11B, an alternate method 1100B for partitioning data across the slave nodes of the global-results processing matrix 118 is illustrated in accordance with at least one embodiment of the present invention. As with method 1100A, each slave node sorts its own data portion (step 1102) and determines a suggested partitioning scheme based on an analysis of its own sorted data portion. However, rather than determining a node-by-node partitioning scheme as in method 1100A, the master node determines a partitioning scheme for sets of slave nodes at step 1116. To illustrate, if there are eight slave nodes, the master node could select a partitioning scheme that partitions the database equally in half, each half being distributed among subsets of four slave nodes, or a partitioning scheme that partitions the database in fourths, each fourth of the database being distributed among a subset of two slave nodes. At step 1118, each slave node is assigned to one of the sub-sets determined at step 1116. The slave nodes preferably are substantially equally distributed among subsets.

At step 1120, one of the slave nodes of each subset is nominated to calculate a sub-partitioning scheme for the nodes of the subset. For example, for a subset of four nodes, the nominated slave node could determine a partitioning scheme that would split the data associated with the subset in half, each half going to one of two subsets of two nodes each. At step 1122, the nodes of the subset are assigned to sub-subsets. At step 1124, the steps 1120 and 1122 are repeated until each subset includes a single slave node with its own database. In effect, this recursive partitioning is analogous to a binary search, whereby the problem is divided and subdivided until the solution is determined. After the recursive partitioning of steps 1116–1124 has completed, the data is transferred between the slave nodes at step 1112 and merge sorted at step 1114, as discussed above. Additionally, the slave nodes may use data compression/decompression techniques when transferring the data to minimize utilization of the network bandwidth.

Referring now to FIG. 12, an exemplary implementation of the Homogeneous Agent (HomAgent) at processing nodes of a processing matrix is illustrated in accordance with at least one embodiment of the present invention. As noted above, in one embodiment, each processing node of a processing matrix implements a HomAgent adapted to communicate with the HomAgents on other processing nodes, receive and execute portion(s) of a DLL or other executable representative of database operation(s) of a query or invoke another process to execute portion(s) of the DLL or other executable, among other operations.

To illustrate, the example of FIG. 12 depicts three processing nodes 1202–1206 of a processing matrix 118, 120, or 122 connected via a network 1220 (e.g., a TCP/IP network implementing Ethernet), where processing node 1202 implements HomAgent 1212, processing node 1204 implements HomAgent 1214, and processing node 1206 implements HomAgent 1216. Each HomAgent, in one embodiment, is adapted to facilitate the transfer of information between its node and the other nodes of the processing matrix and/or one or more other processing matrices. In one embodiment, communications between HomAgents is achieved through one or more techniques for remotely invoking one or more processes, referred to herein generally as remote procedure calls (RPCs). Additionally, the HomAgents 1212–1216 can be adapted to utilize one or more data compression/decompression techniques when transmitting/receiving data, reducing the amount of data transmitted and, therefore, reducing the potential for network congestion. For example, a HomAgent could invoke a process that executes a library DLL having a data compression function to compress data before transmission. The HomAgent receiving the compressed data then could invoke a process that executes a library DLL having a data decompression function to decompress the data before storing the data in memory and/or disk.

FIG. 12 additionally depicts a controller node 1218 connected to the nodes 1202–1206 via the network 1220. In at least one embodiment, the controller node 1218 is adapted to poll each HomAgent at each processor node of the processing matrix to monitor the operating status of the processor node. Upon receipt of a polling request, each HomAgent can be adapted to respond with various information, such as a simple signal indicating that the HomAgent is operative, information regarding the processor utilization, data transfer statistics, and the like. In the event that a HomAgent fails to respond to a polling request, the controller 1218 can initiate a failover recovery process to recover from the failure of the corresponding node. An exemplary failover recovery process is illustrated with reference to FIG. 13.

The HomAgent may be implemented, as the operating system of the processing node. Alternatively, the HomAgent can be implemented as a program or process run on top of an operating system of the processing node. To illustrate, in at least one embodiment, the processing nodes of the processing matrices 118–122 are implemented from general-purpose microcomputer components, such as a personal computer (PC)-based motherboard, processor, memory, hard disk, input/output devices, and the like. In this case, the processor nodes can operate widely-available operating systems, such as, for example, Windows® 98, Windows® 2000, Windows® NT, or XP® operating systems available from Microsoft Corp. of Redmond, Wash., a Linux operating system, or a Solaris® operating system available from Sun Microsystems, Inc. of Santa Clara, Calif. The HomAgent then can include a software process executed by the operating system. Accordingly, the HomAgent can utilize features common to many operating systems, such as network protocol stack support.

In at least one embodiment, each processing node of a processing matrix receives the same version of the HomAgent software during the system configuration phase. Each processing node also receives library DLLs specific to the intended functionality of the processing node, as well as a configuration file used to configure the HomAgent for each node's particular needs. The processing node that is nominated as the master node may receive library DLLs and a configuration file that enables the HomAgent of that node to operate as a master node, whereas processing nodes nominated as slave nodes receive library DLLs and a configuration file that enables their HomAgents to operate as slave nodes. The configuration file may include information indicating which portion of a DLL that the HomAgent is to execute, network configuration information such as an IP address and subnet mask, as well as information regarding other processor nodes, such as the network addresses of the processing node's neighboring nodes, the network address of the master node, the network address of the parent collator node, a indicator of the desired level of logging, a safety indicator used to configure the node to perform either single writes or double writes, and the like. The use of a common HomAgent software program and library DLLs among most or all of the processing nodes of a processing matrix allows the processing matrix to maintain a relatively large degree of flexibility since a processing node can change from, for example, a slave node to a master node by replacing the slave node configuration file with a master node configuration file and then reinitializing the node's HomAgent. Further, by using the same HomAgent software and library DLLs for some or all of the nodes, code maintenance may be reduced as there are fewer versions (or only one version) and efficiency/reliability may increase as more effort can be expended in optimizing the code of the HomAgent.

Figure 13A:
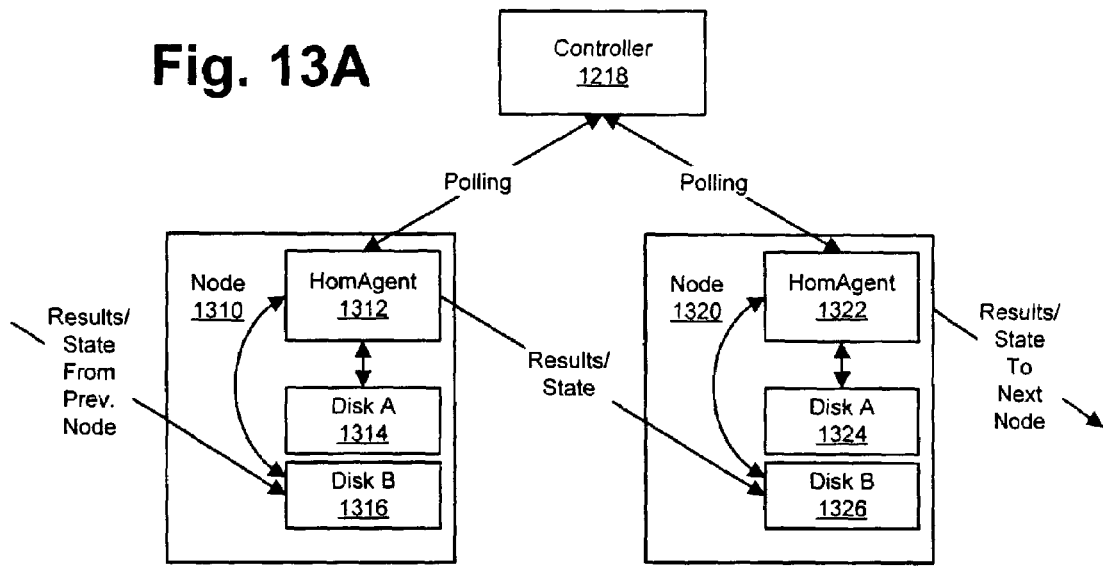
FIGS. 13A and 13B are schematic diagrams illustrating an exemplary system for providing failover protection in the system of FIG. 1 in accordance with at least one embodiment of the present invention.
Figure 13B:
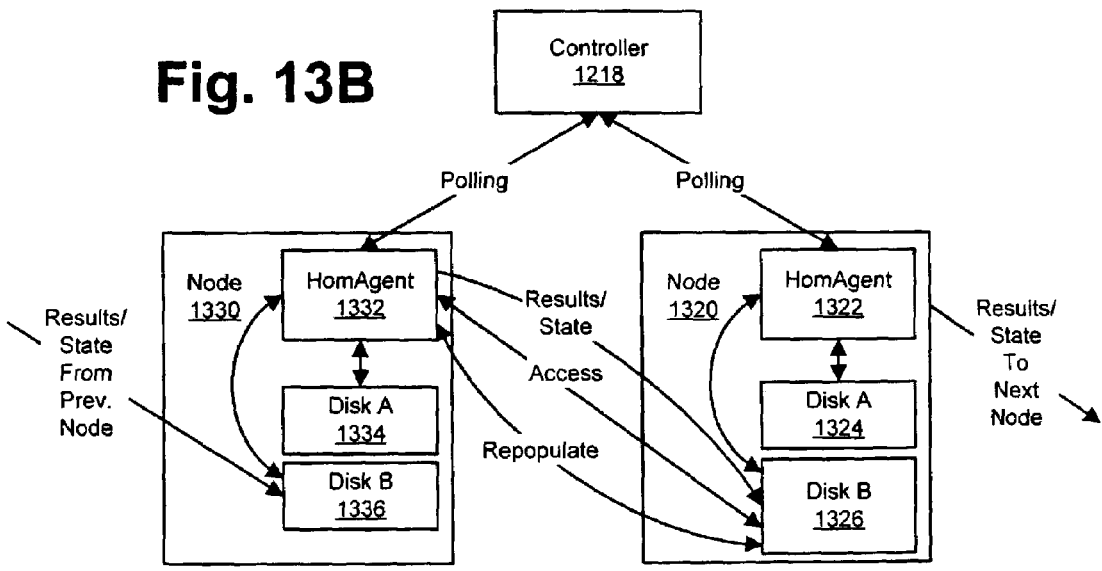

Referring now to FIGS. 13A and 13B, an exemplary failover recovery process is illustrated in accordance with at least one embodiment of the present invention. As illustrated in FIG. 13A, in one embodiment, most or all processing nodes of a processing matrix include two storage devices (or a single storage device having two partitions). Node 1310 includes HomAgent 1312, disk A (disk 1314) and disk B (disk 1316). Node 1320 includes HomAgent 1322, disk A (disk 1324) and disk B (disk 1326). In this example, disk A is used by a HomAgent to store the database portion and/or results of the corresponding node and disk B is used to store the database partition and/or results from a neighboring node.

As noted above, each HomAgent can be adapted to respond to polling requests from a controller 1218. Further, in one embodiment, each HomAgent is adapted to store the corresponding node's state on the disk storage of its neighboring HomAgent, where the node's state can include its database portion stored in memory (not shown) or on disk A, results generated during the execution of a DLL at the node, processor statistics, and the like. To illustrate, while operational, the HomAgent 1312 of node 1310 copies its database portion from memory (if the node is part of matrix 120) or from disk A (disk 1314) (if the node is part of matrix 118) to disk B (disk 1326) of node 1320 (via, for example, RPC to HomAgent 1322). Likewise, any results generated by the node 1310 during the execution of a DLL also may be copied to disk B (disk 1326) of node 1320. Nodes 1310, 1320 also can be adapted to store their state information to other processing nodes of the matrix. As a result, disk B of a slave node has most or all of the data available to or generated by a neighboring node. In another embodiment, each node copies its state (i.e., its database portion and/or generated results) to multiple neighboring nodes to allow for multiple redundancies in case multiple neighboring nodes fail at or about the same time.

FIG. 13B illustrates an exemplary failover recovery process in the event that node 1310 fails. The controller 1218, noting that the node 1310 is not responding to its polling requests, activates the node 1330 and replaces node 1310 with node 1330, whereupon node 1330 starts executing a query operation at the last point that the node 1310 was determined to be functioning properly. The node 1330 at this point does not have the database portion originally or previously distributed to the node 1310 on which node 1310 should execute the database operations. Recall, however, that the database portion distributed to node 1310 and the recent results generated by the node 1310 prior to failure are available on disk B (disk 1326) of the node 1320. The node 1330, therefore, can be adapted to perform the database operations by remotely accessing disk B of node 1320 via, for example, an RPC to the HomAgent 1322. During lulls in the operation of the node 1330 and node 1320, the HomAgent 1332 copies the database portion stored on disk B of the node 1320 to the disk A of the node 1330. Over time, the disk A of the node 1330 will store the entire database portion originally assigned to the node 1310.

Until the data portion on disk B (disk 1326) of the node 1320 to the disk A (disk 1334) of node 1330, the node 1330, in one embodiment, is adapted to perform its database operations using the database portion stored on disk B (disk 1326) of node 1320 and using the data (if any) on disk A (disk 1334) that the node 1320 already has transmitted. To illustrate, assume that at a certain point, 10% of the database portion on disk B (disk 1326) of node 1330 has been transmitted and stored on disk A (disk 1334) of node 1330, while the other 90% of the database portion has not yet been copied. At this point, the node 1330 can be adapted to execute one or more database operations (represented by a DLL) partially on the 10% of the database portion stored in its disk A (disk 1334) and partially on the 90% of the database portion of the disk B (disk 1326) of node 120 that remains uncopied. Once the database portion has been copied to node 1330 in its entirety, the node 1330 can revert to executing database operations solely on the database portion stored on its own disk A (disk 1334).

The execution of database operations by node 1330 using both disk A (disk 1334) of node 1330 and disk B (disk 1326) of node 1320 until the copy of the data portion of the failed node 1310 is completed has a number of advantages. For one, it limits the amount of network traffic since the node 1330 can use the partial database portion and, therefore, limits the number of access requests, replies, and data transmitted between node 1330 and node 1320. Further, the node 1330 can continue to execute database operations without having to wait for the data portion to be completely copied, thereby reducing the response time of the nodes in response to a submitted query.

It will be appreciated that the location of a back-up copy of a data portion assigned to a failed node must be known before the back-up copy can be used to replace the failed node with a replacement node. Accordingly, in at least one embodiment, the nodes 1310–1320 are adapted to write references to the one or more storage locations of back-up copies of their corresponding data portions to the corresponding work-unit at the work-unit reporting module 202 (FIG. 2) or by storing references at the naming services module 112. In at least one embodiment, the references to the storage locations can use logical references that may be resolved using the naming services module 112 (FIG. 1). Accordingly, when a node fails, a replacement node may request the storage locations of the backup copy or copies of the failed node's data portion from the work-unit reporting module 202 or the naming services module 112. The replacement node (e.g., node 1330) may then resolve the actual storage location (e.g., node 1320) using the naming services module 112 and commence the copy or transfer of the backup copy from the actual storage location. The use of the work-unit reporting module 202 and/or the naming services module 112 to record the storage location of back-up copies of data portions and/or results provides flexibility and allows additional redundancy because a node does not have to use a predetermined storage location, rather, the node has the flexibility to select an appropriate storage location based on the circumstances and then report its selected storage location to the work-unit reporting module 202 and/or the naming services module 112 for future reference in the event of a failure of the node.

Figure 14:
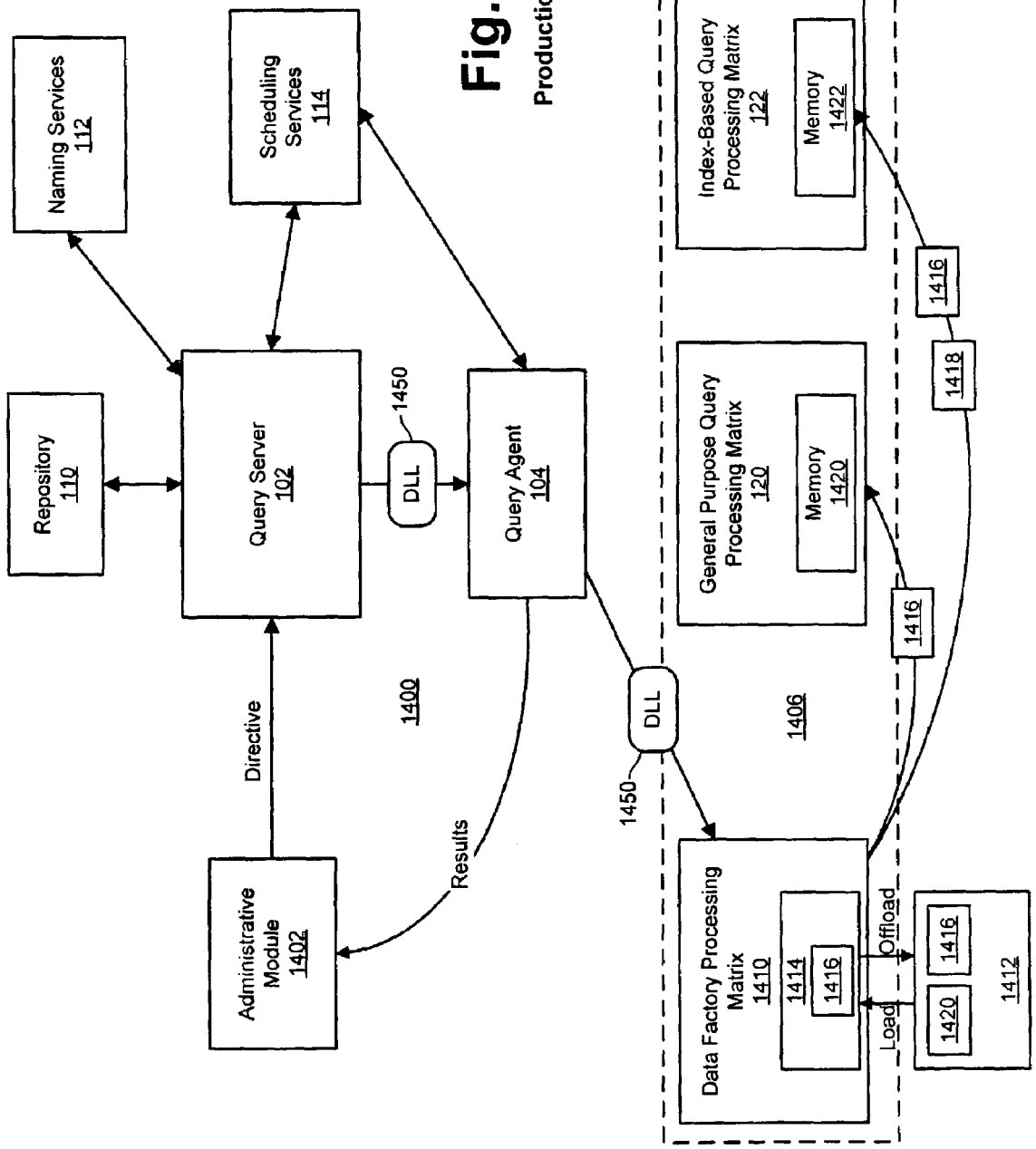
FIG. 14 is a schematic diagram illustrating an exemplary system for distributing database data within the system of FIG. 1 in accordance with at least one embodiment of the present invention.
Figure 15:
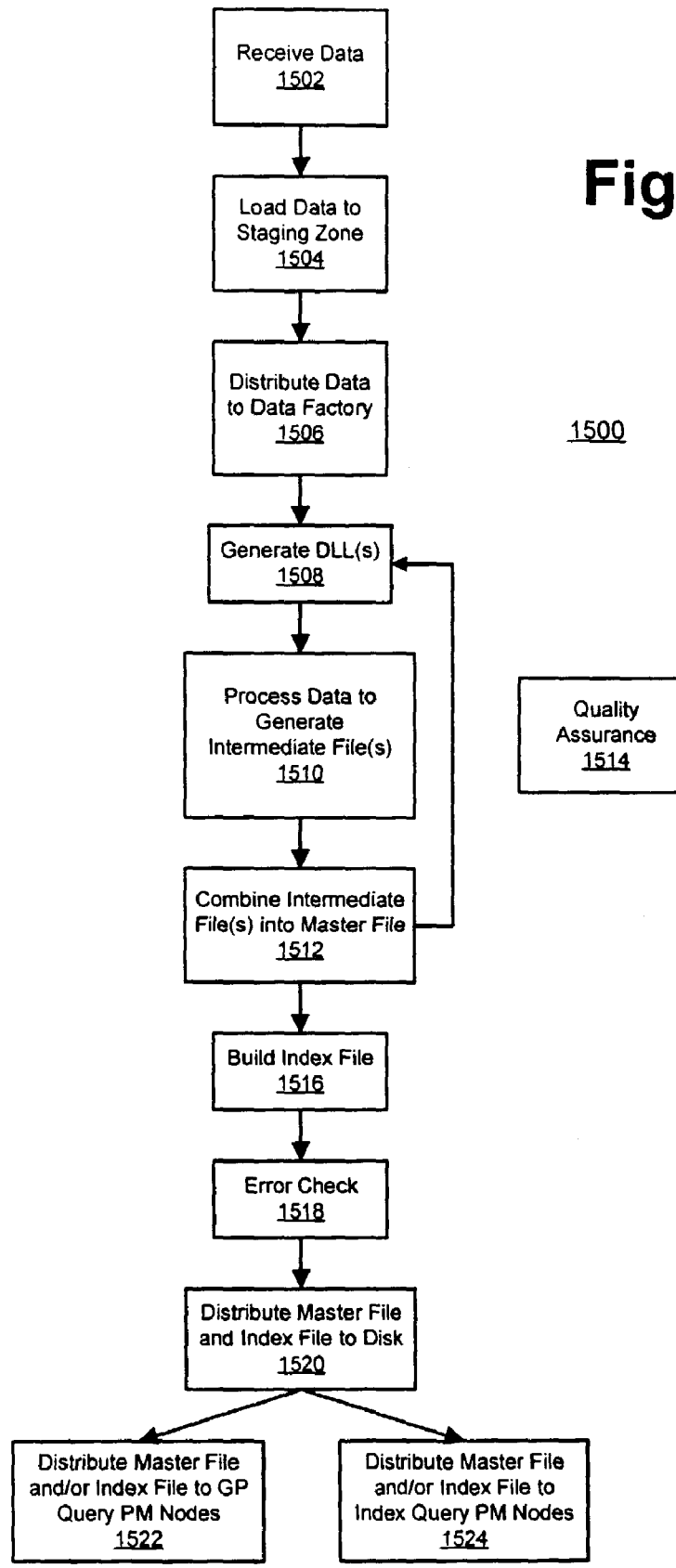
FIG. 15 is a flow diagram illustrating an exemplary method for distributing database data using the system of FIG. 14 in accordance with at least one embodiment of the present invention.

Referring now to FIGS. 14 and 15, an exemplary production phase system 1400 for use in building and preparing the system 100 of FIG. 1 is illustrated in accordance with at least one embodiment of the present invention. The illustrated exemplary system 1400 includes the query server 102, the query agent 104, the repository 110, the naming services module 112, and the scheduling services module 114 of the system 100 of FIG. 1. The system 1400 further includes an administrative module 1402 and production matrix 1406 comprising one or more of the processing matrices 118–122 of the computing matrix 116 of the system 100. The production matrix 1406 further includes a data factory processing matrix 1412 connected to a staging zone 1412.

As demonstrated above, the system 100, in one embodiment, is adapted to receive a query from a client, generate a DLL or other executable representative of the query, and process the DLL or other executable using one or more parallel processing matrices of the computing matrix 116. It may be necessary, however, to distribute the data to the nodes of the processing matrices 120, 122 prior to the processing of any of the queries. In at least one embodiment, the production phase system 1400 is adapted to distribute data to one or both of the processing matrices 120, 122. In many cases, the data to be processed for queries may come from one or more different databases, may be an update to an existing data set, and the like. Accordingly, the system 1400 can be adapted to process incoming data to generate one or more master databases and then distribute the master database(s) to the processing matrices 120, 122 as appropriate. To eliminate the complexities of inserting and modifying data in a database distributed across multiple nodes, the system 100 of FIG. 1 preferably is a "read-only" database system whereby query operations may identify and copy information from the database portions distributed among the nodes, but the new data cannot be inserted nor can data be materially altered.

FIG. 15 illustrates an exemplary method 1500 for data distribution using the system 1400. The method 1500 initiates at step 1502, wherein source data (data 1420) to be distributed to the processing matrices 120, 122 is received from a data source, such as via the staging zone 1412. This data can be received via non-volatile storage, such as tape or hard disk, provided over a computer network, and the like. At step 1504, the data is transferred onto the staging zone 1412. The staging zone 1412 can include any of a variety of data stores, such as a Symmetrix 8830 available from EMC Corporation of Hopkinton, Mass.

The source data is loaded from the staging zone 1412 into the storage 1414 of the data factory processing matrix 1410 at step 1512. In at least one embodiment, the data factory processing matrix 1410 includes one or more of the global-results processing matrices 118 (FIG. 1) put to use for data production. Accordingly, in this case, the storage 1414 represents the non-volatile storage at each node of the processing matrix 118/1410.

At step 1508, an administrator provides input to the administrative module 1402 describing the desired distribution of data in the processing matrices 120/122. The data can be distributed in a number of ways. In some instances, the data preferably is randomly distributed. Alternatively, the data can be distributed in a sorted arrangement. The administrative module 1402 directs the query server 102 to generate a DLL 1450 based on the desired distribution of data, where the DLL 1450 is generated to manipulate the data factory processing matrix 1412 to achieve the desired distribution.

At step 1510, the data factory processing matrix 1410 processes the DLL on the source data 1420 to generate one or more intermediate files. At step 1512, the intermediate files are joined into a master file 1416 and the master file 1416 is stored to disk 1414. Quality assurance processes can be performed on the master file 1416 at step 1514, and if the master file 1416 is found deficient, steps 1508–1512 can be repeated until the master file 1416 is satisfactory.

At step 1516, the data factory processing matrix 1410 reads the master file 1416 from disk into memory and builds one or more index files 1418 for specified fields of data represented by the master file 1416. A data integrity check can be performed on the master file 1416 and/or the index file(s) 1418 at step 1518 and the files may then stored to disk 1414 at step 1520.

At step 1522, the master file 1416 is distributed into the memory 1420 of the general-purpose query processing matrix 120. Recall that in at least one embodiment, the general-purpose query processing matrix 120 is implemented as a plurality of interconnected processing nodes, each node having its own memory resources. In this case, the memory 1420 represents the collective memory resources of the slave nodes of the processing matrix 120. The data comprising the master file 1416 can be distributed among the slave nodes of the processing matrix 120 in a variety of ways. As noted above, the performance of a number of database operations may be optimized when the data is randomly distributed across the slave nodes of the processing matrix 120. To this end, the data factory processing matrix 1410 can be adapted to distribute the data of the master file 1416 among the nodes by performing a hash function keyed to one of the fields of the data. For example, if the master file 1416 represented a credit rating data set, the credit rating records could be randomly distributed among the nodes based on a hash function performed on the social security number associated with each record of the data set.

At step 1524, the master file 1416 and the index file(s) 1418 are distributed to the memory 1422 of the index-based query processing matrix 122. Recall that in at least one embodiment, the index-based query processing matrix 122 also is implemented as a plurality of processing nodes operating in parallel. As with step 1522, the data of the master file 1416 and the index file(s) 1418 can be randomly distributed using a hashing function. Other methods of distributing the data among the nodes of the processing matrix 120 and/or the nodes of the processing matrix 122 can be utilized without departing from the spirit or the scope of the present invention.

Figure 16:
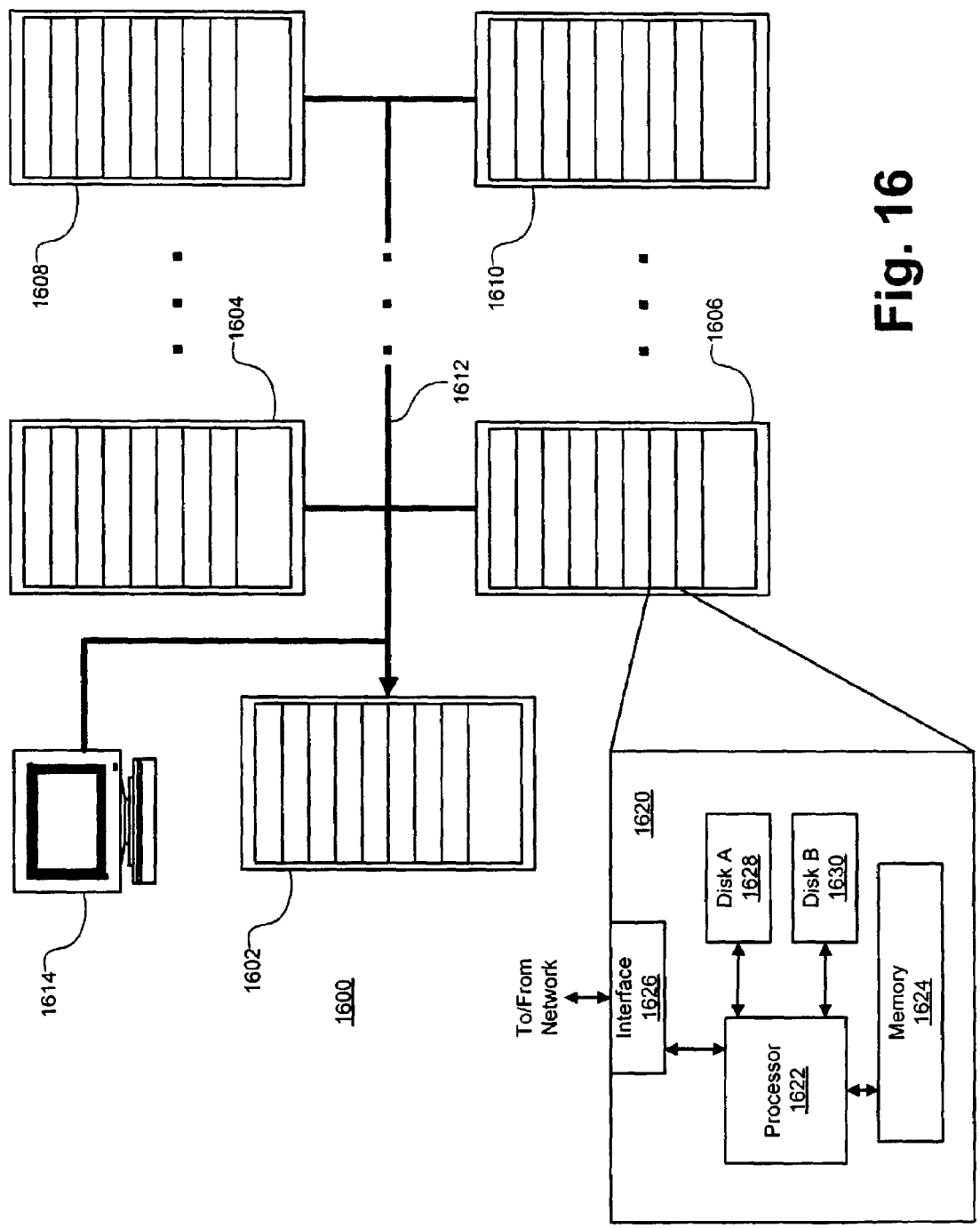
FIG. 16 is a schematic diagram illustrating an exemplary hardware architecture for the system of FIG. 1 in accordance with at least one embodiment of the present invention.
Figure 17:
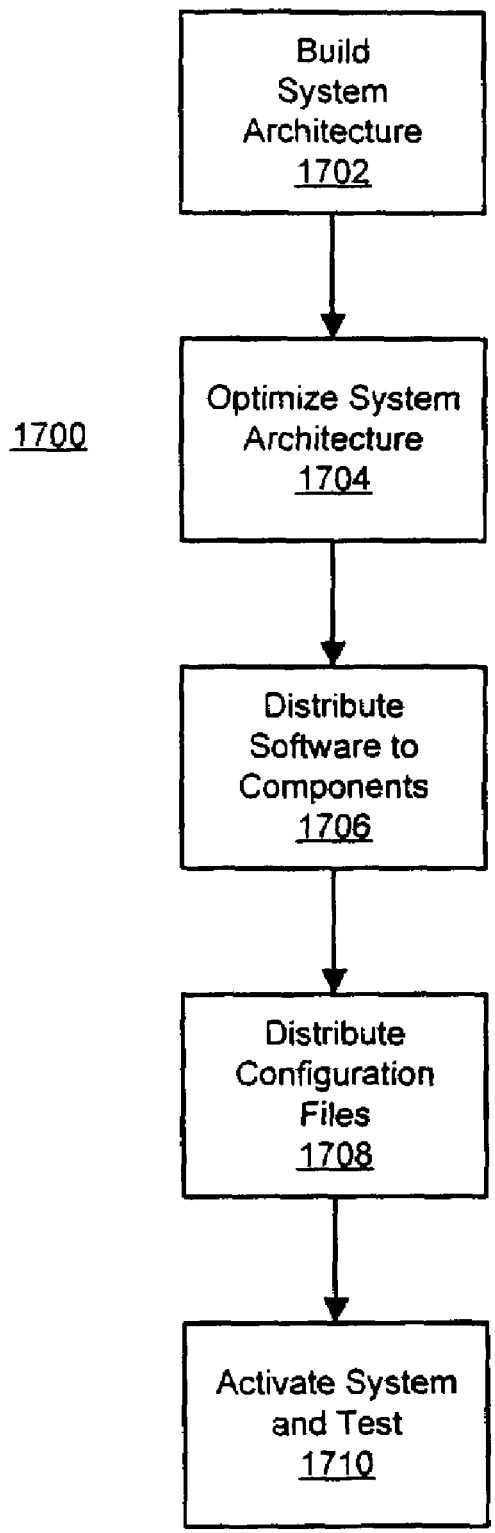
FIG. 17 is a flow diagram illustrating an exemplary method for configuring the system of FIG. 1 using the hardware architecture of FIG. 16 in accordance with at least one embodiment of the present invention.

Referring now to FIGS. 16 and 17, an exemplary physical architecture and method of configuring the system 100 (FIG. 1) are illustrated in accordance with at least one embodiment of the present invention. In the illustrated example, the system 100 is implemented as a plurality of processing nodes 1620 connected via a network 1612. Each processing node 1620 includes one or more processors 1622, memory 1624 (e.g., random access memory), one or more disk storage devices 1628, 1630, and a network interface 1626 to the network 1612. Each node 1620 preferably is implemented using a "shared nothing" architecture whereby each node includes its own memory, disk, and processor that is not directly accessible by another processing node. The nodes may be divided among one or more network racks 1602–1610. The system 100 further may comprise an administrator computer 1614 for configuring and managing the components of the system.

In at least one embodiment, the nodes 1620 of the system 100 are substantially homogeneous. For example, the nodes 1620 may only vary by memory capacity, disk storage capacity, processor speed, etc., and are largely interchangeable, thus providing a high degree of simplicity, uniformity, flexibility, and capability to the system 100. The nodes 1620 can be dynamically assigned to various components of the system 100 depending on the data to be processed, the types of queries to be submitted, and the like. For example, the computing matrix 116 of the system 100 could include a two-hundred-node global-results processing matrix 118 and two one-hundred-node general-purpose processing matrices 120. Accordingly, two hundred processing nodes 1620 could be assigned and configured for use as the global-results processing matrix 118, two hundred nodes 1620 could be assigned and configured for use as the two general-purpose processing matrices 120. One of the nodes 1620 could be assigned to operate as the repository 110, one node 1620 could be assigned to operate as the naming services module 112, and another node 1620 could be assigned to operate as the scheduling services module 114. If, for example, the system 100 included two query servers 102 and four query agents 104, two nodes 1620 each could be assigned to operate as a query server 102 and four nodes 1620 could be assigned to operate as query agents 104. The remaining nodes 1620 then could be assigned to perform other functions of the system 100 as described herein.

In one embodiment, each node 1620 of the system 100 is loaded with software (e.g., the HomAgent, associated library DLLs, and/or an operating system) related to its assigned function. For the nodes 1620 assigned to the computing matrix 116, the nodes can be loaded with the same HomAgent but with different library DLLs and configuration files. The same HomAgent on one node 1620 having a certain configuration file may operate in an entirely different manner on another node 1620 having a different configuration file and/or library DLLs.

The use of substantially homogeneous nodes 1620 for varying components of the system 100 provides a number of advantages. For one, the expense of implementation may be reduced as specialized hardware can be minimized or eliminated. Furthermore, homogeneity can provide for increased flexibility in configuring and operating the system 100. Since each node is substantially the same, a node used as a slave node of a processing matrix in one system configuration can be quickly converted for use as a query agent 104 in a subsequent configuration without requiring any physical modification of the node itself. Rather, all that may be required is to load a different configuration file and/or library DLLs to the node when it is configured for a different operation.

Referring now to FIG. 17, an exemplary method 1700 for configuring the nodes 1620 to operate in the system 100 of FIG. 1 is illustrated in accordance with at least one embodiment of the present invention. Method 1700 initiates at step 1702 whereby the system architecture (i.e., which nodes are to be assigned to which system component) is specified by an administrator using the administration computer 1614. At step 1704, the system architecture is optimized by, for example, ensuring that the nodes 1620 assigned to a specific component of the system 100 are all within the same subnet. Otherwise, communications between the nodes 1620 could be undesirably delayed as the data traversed different subnets.

At step 1706, HomAgent software, library DLLs, and/or operating system software is distributed to each node 1620 of the system 100 according to the system architecture developed in steps 1702–1704. In many instances, the HomAgent software and/or operating system software may already be installed on some or all of the processing nodes.

At step 1708, the administration computer 1614 provides configuration files to each of the nodes 1620 of the system.

These configuration files may be used to configure the HomAgent software provided to the nodes 1620 at step 1708. For example, the configuration file transmitted to a node 1620 assigned to operate as an query server 102 could include the IP addresses of the node 1620 assigned to operate as the repository 110, the IP address of the node 1620 assigned to operate as the naming services module 112, the IP address of the node 1620 assigned to operate as the scheduling services module 114, and so on. For the nodes 1620 assigned to the processing matrices 118–122, the configuration file also could also include an indicator of the portion or portions of a DLL that each node 1620 is to execute.

At step 1710, the system 100 is activated and tested to ensure that the system 100 is working properly. At this point, the system 100 is ready for the data production phase illustrated with reference to FIGS. 14 and 15.

Other embodiments, uses, and advantages of the invention will be apparent to those skilled in the art from consideration of the specification and practice of the invention disclosed herein. The specification and drawings should be considered exemplary only, and the scope of the invention is accordingly intended to be limited only by the following claims and equivalents thereof.

---

ECL statement:

count(header.File_Headers(st='FL' and fname[1 . . 2]='DA'))
Resulting C++ intermediary source code:

```
/* Template for generating multi-node thor output */
#ifdef _WIN32
#define ECL_API ___declspec(dllexport)
#define SERVICE_API ___declspec(dllimport) _stdcall
#define RTL_API _declspec(dllimport)
#define BCD_API _declspec(dllimport) _fastcall
#else
#define ECL_API
#define SERVICE_API
#define RTL_API
#define BCD_API
#endif
#include <string.h>
#include <malloch.h>
#include <stdlib.h>
#include <ctype.h>
#include <math.h>
#ifdef _linux_
#include "platform.h"
#endif
#include "thgraph.hpp"
#define REAL_THOR
#include "eclagent.hpp"
#include "rtlkey.hpp"
#include "rtliter.ipp"
#ifndef _CINTERFACE_DEFINED
#define _CINTERFACE_DEFINED
class _CInterface
{
public:
    _CInterface( )                { xxcount = 0; }
    virtual ~_CInterface( ) { }
    void Link(void)
    {
//              ICrit->enter( );
                xxcount++;
//              ICrit->leave( );
    }
    bool Release(void)          // return true if disposed
    {
//              ICrit->enter( );
                if (xxcount-- == 0)
                {
//                      ICrit->leave( )
                        delete this;
                        return true;
                }
//              ICrit->leave( );
                return false;
    }
    bool            IsShared(void) const    { return (xxcount != 0); }
    int             getCount(void) const    { return xxcount; }
private:
    long            xxcount;
};
#endif
struct fieldinfo
{
  unsigned type;
  unsigned size;
  const char *name;
};
inline void _cpyrev2(void *d, const void *s) { ((char*)d) [0]= ((char*)s) [1]; ((char*)d) [1]= ((char*)s)[0]; }
inline void _cpyrev4(void *d, const void *s) { ((char*)d) [0]= ((char*)s)[3];
((char*)d)[1]=((char*)s)[2];
(char*)d) [2]=((char*)s)[1]; ((char*)d)[3]=((char*)s) [0]; }
inline void _cpyrev8(void *d, const void *s) { ((char*)d) [0]= ((char*)s)[7];
((char*)d)[1]=((char*)s)[6];
((char*)d)[2]=((char*)s)[5]; ((char*)d)[3]=((char*)s)[4];
(char*)d) [4]=((char*)s)[3]; ((char*)d)[5]=((char*)s)[2];
(char*)d) [6]=((char*)s)[1]; ((char*)d)[7]=((char*)s)[0]; }
RTL_API void rtlConcat(unsigned & tlen, char * * tgt, . . . );
RTL_API void rtlConcatVStr(char * * tgt, . . . );
struct OutputMetaDataBase : public IOutputMetaData, public _CInterface {
virtual void SCMCALL Link( ) { _CInterface::Link( ); }
virtual bool SCMCALL Release( ) { return _CInterface::Release( ); }
virtual bool isGrouped( ) { return false; }
};
extern _declspec(dllimport) void _fastcall DecLock( );
extern _declspec(dllimport) void _fastcall DecUnlock( );
struct BcdCriticalBlock
{
   BcdCriticalBlock( )        { DecLock( ); }
   ~BcdCriticalBlock( )       { DecUnlock( ); }
};
struct miGI43UB : public OutputMetaDataBase {
   virtual size_t getRecordSize(const void *rec) { return 258; }
   virtual size_t recordSizeExtent( ) { return 0; }
} mxGI43UB;
extern "C" _declspec(dllexport) IRecordSize * mfGI43UB( )
{ mxGI43UB.Link( );
return &mxGI43UB; }
struct mi0HOJVB : public OutputMetaDataBase {
   virtual size_t getRecordSize(const void *rec) { return 8; }
   virtual size_t recordSizeExtent( ) { return 0; }
}   mx0HOJVB;
extern "C"   _declspec(dllexport) IRecordSize * mf0HOJVB( )
{ mx0HOJVB.Link( );
return &mx0HOJVB; }
struct mi : public OutputMetaDataBase {
   virtual size_t getRecordSize(const void *rec) { return 0; }
   virtual size_t recordSizeExtent( ) { return 0; }
}   mx;
extern "C"   _declspec(dllexport) IRecordSize * mf( ) { mx.Link( );
return &mx;
}
const char * queryEclTextiV5B3(ICodeContext * ctx) {
    return "no_thor_diskread(header_File_Headers(st = 'FL' AND fname[1 . . 2] = 'DA'));\n";
}
const char * queryEclTexti16B3(ICodeContext * ctx) {
    return "aggregate(no_thor_diskread(header_File_Headers(st = 'FL'
AND fname[1 . . 2] = 'DA')),"
        " { integer8 _f1_ := COUNT(group)}, NEWTRANSFORM\n"
        "\t_f1_ := COUNT(group);\n"
        "\tEND));\n"
        "";
}
```

-continued

```
const char * queryEclTexti26B3(ICodeContext * ctx) {
   return
"no_setresult(EVALUATE(aggregate(no_thor_diskread(header_
File_Headers(st =
'FL' AND fname[1. . 2] = 'DA')),"
   " { integer8 _f1_ := COUNT(group)}, NEWTRANSFORM\n"
   "\t_f1_: = COUNT(group);\n"
   "\tEND)[1], _f1_), 0);\n"
   "";
}
struct cV5B3 : public _CInterface, public IHThorDiskReadArg {
   virtual void SCMCALL Link( ) { _CInterface::Link( ); }
   virtual bool SCMCALL Release( ) { return _CInterface::Release( ); }
   virtual void setContext(ICodeContext * _ctx) {
      ctx =_ctx;
   }
   virtual const char * getFileNaine( ) {
      return "~thor_data400::base::header_tnt20021031";
   }
   virtual bool needTransform( ) { return true; }
   virtual bool transformMayFilter( ) { return true; }
   virtual const char * getPipeProgram( ) {
      return NULL;
   }
   virtual unsigned getFlags( ) { return TDRunsorted; }
   virtual void setBaseOffset(unsigned _int64 baseoffset) { _fpos =
baseoffset; }
   unsigned _int64 _fpos;
   virtual unsigned _int64 getBaseOffset( ) { return 0; }
   virtual size_t transform(void * _self, const void * _left) {
      unsigned char.* self = (unsigned char *)self;
      unsigned char * left = (unsigned char *)left;
      unsigned _int64 v06B3;
      v06B3 = _fpos;
      _fpos = _fpos + 258;
      if (!(memcmp((char *)(left + 239),"FL",2) == 0 &&
memcmp((char *)(left + 85),"DA",2) == 0)) {
         return 0;
      }
      memcpy(self, left, 258);
      return 258;
   }
   virtual IRecordSize * queryDiskRecordSize( ) { return &mxGI43UB; }
   virtual IOutputMetaData * queryOutputMeta( ) { return &mxGI43UB; }
   ICodeContext * ctx;
};
extern "_C" declspec(dllexport) IHThorArg * fV5B3( ) {
return new cV5B3; }
struct c16B3 : public _CInterface, public IHThorAggregateArg {
   virtual void SCMCALL Link( ) { _CInterface::Link( ); }
   virtual bool SCMCALL Release( ) { return _CInterface::Release( ); }
   virtual void setContext(ICodeContext * _ctx) {
      ctx = _ctx;
   }
   virtual void clearAggregate(void * _self) {
      unsigned char * self = (unsigned char *) _self;
      *((_int64 *)(self + 0)) = 0;
   }
   virtual void processFirst (void * _self, const void * _src) {
      unsigned char * self = (unsigned char *) _self;
      unsigned char * src = (unsigned char *) _src;
      *((_int64 *)(self + 0)) = 1;
   }
   virtual void processNext(void * _self, const void * _src) {
      unsigned char * self = (unsigned char *) _self;
      unsigned char * src = (unsigned char *) _src;
      *((_int64 *)(self + 0)) = *((_int64 *)(self + 0)) + 1;
   }
   virtual void mergeAggregate(void * _left, const void * _right) {
      unsigned char * left = (unsigned char *) _left;
      unsigned char * right = (unsigned char *) _right;
      *((_int64 *)(left + 0)) = *((_int64 *)(left + 0)) +
*((_int64 *)(right + 0));
   }
   virtual IOutputMetaData * queryOutputMeta( )
   { return &mx0HOJVB; }
   ICodeContext * ctx;
};
extern "C" _declspec(dllexport) IHThorArg * f16B3( )
```

-continued

```
{ return new c16B3; }
struct c26B3 : public _CInterface, public IHThorRemoteResultArg {
   virtual void SCMCALL Link( ) { _CInterface::Link( ); }
   virtual bool SCMCALL Release( ) { return _CInterface::Release( ); }
   virtual void setContext(ICodeContext * _ctx) {
      ctx = _ctx;
   }
   virtual unsigned getSequence( ) { return 0; }
   virtual void sendResult(const void * _self) {
      const unsigned char * self = (const unsigned char *)_self;
      _int64 v36B3;
      v36B3 = *((_int64 *) (self + 0));
      ctx->setResultInt(0,0,v36B3);
   }
   virtual IOutputMetaData * queryOutputMeta( ) { return NULL; }
   ICodeContext * ctx;
};
extern "C" _declspec(dllexport) IHThorArg * f26B3( ) { return
new c26B3; }
class TestEclProcess : public IEclprocess
{
public:
   virtual int perform(IGlobalCodeContext *);
   virtual const char * getECL(IGlobalCodeContext * ctx);
} process;
const char * TestEclProcess::getECL(IGlobalCodeContext * ctx)
{
   return NULL;
}
int TestEclProcess::perform(IGlobalCodeContext *ctx)
{
   const char *responseEp1;
   {
      IThorActivityGraphInfo *graph1 = createActivityGraph( );
      IThorActivityInfo * iV5B3 =
createActivity(ak_diskread,109759,queryEclTextiv5B3(ctx));
      iV5B3->setProp("helperSo",
"W20021107-093222-609216216.dll");
      iV5B3->setProp("helperFactory", "fV5B3");
      iV5B3->setProp("recordFactory", "mfGI43UB");
      graph1->addActivity(iV5B3);
      IThorActivityInfo * i16B3 =
createActivity(ak_aggregate,109761,queryEclTexti16B3(ctx));
      i16B3->setProp("helperSo",
"W20021107-093222-609216216.dll")
      i16B3->setProp("helperFactory", "f16B3");
      i16B3->setProp("recordFactory", "mf0HOJVB");
      graph1->addActivity(i16B3);
      graph1->connectActivity(iv5B3,i16B3,0,0);
      IThorActivityInfo * i26B3 =
createActivity(ak_remoteresult,109762,queryEclTexti26B3(ctx));
      i26B3->setProp("helperSo",
"W20021107-093222-609216216.dll");
      i26B3->setProp("helperFactory", "f26B3");
      i26B3->setProp("recordFactory", "mf");
      graph1->addActivity(i26B3);
      graph1->connectActivity(i16B3,i26B3,0,0);
      graph_id gid1 = sendGraphInfo(graph1, ctx, responseEp1);
      graph1->Release( );
   }
   return 1;
}
extern "C" ECL_API IEclProcess* getProcess(const char *wuid)
{
   return &process;
}
```

What is claimed is:

1. A system for scheduling database operations on at least one database, the system comprising:

a first global-results processing matrix having a plurality of interconnected processing nodes operating in parallel and being adapted to execute an executable on the at least one database, the executable being representative of a compiled query having at least one database operation;

a first query agent connected to the first global-results processing matrix and being adapted to manage the execution of the executable by the first global-results processing matrix; and a scheduling services module connected to the query agent and the first global-results processing matrix and being adapted to:

schedule a time for the execution of the executable by the first global-results processing matrix;

adjust the scheduled time of the execution of the executable based on information received from the global-results processing matrix or the first query agent; and direct the first query agent to submit the executable to the first global-results processing matrix for the execution at the adjusted scheduled time of the execution.

2. The system of claim 1, wherein the scheduling services module is further adapted to adjust the scheduled time of the execution for the executable based in part on a difference between an expected execution time and an actual execution time of at least one executable previously executed by the first global-results processing matrix.

3. The system of claim 2, wherein the first query agent is further adapted to provide an indication of a progress of an execution of an executable by the first global-results processing matrix to the scheduling services module.

4. The system of claim 1, further comprising:

a second global-results processing matrix having a plurality of interconnected processing nodes operating in parallel and being adapted to execute a second executable on the at least one database, the second executable being representative of a compiled query having at least one database operation;

a second query agent connected to the second global-results processing matrix and the scheduling services module and being adapted to manage the execution of the second executable by the second global-results processing matrix; and wherein the scheduling services module is further adapted to:

schedule a time for the execution of the second executable by the second global-results processing matrix; and direct the second query agent to submit the second executable to the second global-results processing matrix for the execution at the scheduled time of the execution of the second executable.

5. The system of claim 4, wherein the scheduling services module is further adapted to schedule executions of executables at the first global-results processing matrix and the second global-results processing matrix to minimize execution times for the executables.

6. The system of claim 4, wherein the scheduling services module is further adapted to schedule executions of executables at the first global-results processing matrix and the second global-results processing matrix to maximize utilization of the first global-results processing matrix and the second global-results processing matrix.

7. The system of claim 4, wherein the scheduling services module is further adapted to schedule executions of executables at the first global-results processing matrix and the second global-results processing matrix to minimize delays in execution of the executables by the first global-results processing matrix and the second global-results processing matrix.

8. The system of claim 1, further comprising:

a general-purpose query processing matrix having a plurality of interconnected processing nodes operating in parallel and being adapted to execute a third executable on the at least one database, the third executable being representative of a compiled query having at least one database operation;

a second query agent connected to the general-purpose query processing matrix and the scheduling services module and being adapted to manage the execution of the third executable by the general-purpose query processing matrix; and wherein the scheduling services module is further adapted to:

schedule a time for the execution of the third executable by the general-purpose query processing matrix; and direct the second query agent to submit the third executable to the general-purpose query processing matrix for the execution at the scheduled time of the execution of the third executable.

9. The system of claim 8, wherein the scheduling services module is further adapted to schedule executions of executables at the first global-results processing matrix and the general-purpose query processing matrix to minimize execution times for the executables.

10. The system of claim 8, wherein the scheduling services module is further adapted to schedule executions of executables at the first global-results processing matrix and general-purpose query processing matrix to maximize utilization of the first global-results processing matrix and the general-purpose query processing matrix.

11. The system of claim 8, wherein the scheduling services module is further adapted to schedule executions of executables at the first global-results processing matrix and the second global-results processing matrix to minimize delays in execution of the executables by the first global-results processing matrix and the general-purpose query processing matrix.

12. In a parallel processing based database management system, a method for scheduling execution of compiled executables representing queries having at least one database operation, the method comprising:

scheduling a time for execution of an executable by a first global-results processing matrix, the first global-results processing matrix having a plurality of interconnected processing nodes operating in parallel and being adapted to execute the executable on at least one database;

adjusting the scheduled time of the execution of the executable based on information received from the first global-results processing matrix or a first query agent, the first query agent connected to the first global-results processing matrix and being adapted to manage the execution of the executable by the first global- results processing matrix; and submitting, at the adjusted scheduled time, the executable to the first global-results processing matrix for the execution via the first query agent.

13. The method of claim 12, further comprising adjusting the scheduled time of the execution of the executable by the first global-results processing matrix based in part on a difference between an expected execution time and an actual execution time of at least one executable previously executed by the first global-results processing matrix.

14. The method of claim 12, further comprising:
scheduling a time for execution of a second executable by a second global-results processing matrix; and
submitting, at the scheduled time for the second executable, the second executable to the second global-results processing matrix for execution.

15. The method of claim 14, wherein the scheduling of the executions of the executables at the first global-results processing matrix and the second global-results processing matrix is determined to minimize execution times for the executables.

16. The method of claim 14, wherein the scheduling of the executions of the executables at the first global-results processing matrix and the second global-results processing matrix is determined to maximize utilization of the first global-results processing matrix and the second global-results processing matrix.

17. The method of claim 14, wherein the scheduling of the executions of the executables at the first global-results processing matrix and the second global-results processing matrix is determined to minimize delays in execution of the executables by the first global-results processing matrix and the second global-results processing matrix.

18. The method of claim 12, further comprising:
scheduling a time for execution of a third executable by a general-purpose query processing matrix; and
submitting, at the scheduled time for the third executable, the third executable to the general-purpose processing matrix for execution.

19. The method of claim 18, wherein the scheduling of the executions of the executables at the first global-results processing matrix and the general-purpose query processing matrix is determined to minimize execution times for the executables.

20. The method of claim 18, wherein the scheduling of the executions of the executables at the first global-results processing matrix and the general-purpose query processing matrix is determined to maximize utilization of the first global-results processing matrix and the general-purpose query processing matrix.

21. The method of claim 18, wherein the scheduling of the executions of the executables at the first global-results processing matrix and the general-purpose query processing matrix is determined to minimize delays in execution of the executables by the first global-results processing matrix and the general-purpose query processing matrix.

22. The method of claim 12, further comprising:
scheduling a time for execution of a fourth executable by an index-based query processing matrix; and
submitting, at the scheduled time for the fourth executable, the fourth executable to the index-based query processing matrix for execution.

23. The method of claim 21, wherein the scheduling of the executions of the executables at the first global-results processing matrix and an the index-based query processing matrix is determined to minimize execution times for the executables.

24. The method of claim 22, wherein the scheduling of the executions of the executables at the first global-results processing matrix and an index-based query processing matrix is determined to maximize utilization of the first global-results processing matrix and the index-based query processing matrix.

25. The method of claim 22, wherein the scheduling of the executions of the executables at the first global-results processing matrix and an index-based query processing matrix is determined to minimize delays in execution of the executables by the first global-results processing matrix and the index-based query processing matrix.

* * * * *